(12) United States Patent
Zheng et al.

(10) Patent No.: US 12,256,376 B2
(45) Date of Patent: Mar. 18, 2025

(54) CONTROL CHANNEL TRANSMISSION METHOD AND APPARATUS

(71) Applicant: HUAWEI TECHNOLOGIES CO., LTD., Guangdong (CN)

(72) Inventors: Juan Zheng, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 436 days.

(21) Appl. No.: 17/665,325

(22) Filed: Feb. 4, 2022

(65) Prior Publication Data

US 2022/0159680 A1 May 19, 2022

Related U.S. Application Data

(63) Continuation of application No. PCT/CN2019/100727, filed on Aug. 15, 2019.

(51) Int. Cl.
*H04W 4/00* (2018.01)
*H04W 72/0446* (2023.01)
*H04W 72/0453* (2023.01)
*H04W 72/1263* (2023.01)
*H04W 72/23* (2023.01)

(52) U.S. Cl.
CPC ... *H04W 72/1263* (2013.01); *H04W 72/0446* (2013.01); *H04W 72/0453* (2013.01); *H04W 72/23* (2023.01)

(58) Field of Classification Search
CPC ......... H04W 72/1263; H04W 72/0446; H04W 72/0453; H04W 72/23; H04L 5/0053
See application file for complete search history.

(56) References Cited

U.S. PATENT DOCUMENTS

| 2020/0178232 | A1 | 6/2020 | Li et al. | |
| 2020/0259586 | A1* | 8/2020 | Seo | ............................. H04L 5/00 |
| 2021/0084623 | A1* | 3/2021 | Zhang | .................... H04W 72/56 |
| 2022/0086776 | A1 | 3/2022 | Li | |
| 2022/0346116 | A1* | 10/2022 | Lin | ..................... H04W 56/001 |

FOREIGN PATENT DOCUMENTS

| CN | 109845372 A | 6/2019 |
| WO | 2019029014 A1 | 2/2019 |

OTHER PUBLICATIONS

3GPP TS 38.101-1 V16.0.0 (Jun. 2019), "3rd Generation Partnership Project; Technical Specification Group Radio Access Network; NR; User Equipment (UE) radio transmission and reception; Part 1: Range 1 Standalone (Release 16)," Jun. 2019, 268 pages.

(Continued)

*Primary Examiner* — Thai D Hoang
(74) *Attorney, Agent, or Firm* — Fish & Richardson P.C.

(57) ABSTRACT

The present disclosure relates to communication methods and apparatus. In one example method, a first control resource set is determined, where a quantity of symbols comprised in the first control resource set in time domain is a positive integer less than or equal to M, and M is an integer greater than 3. Control information is received on one or more resource elements in the first control resource set.

15 Claims, 19 Drawing Sheets

(56) References Cited

OTHER PUBLICATIONS

3GPP TS 38.211 V15.6.0 (Jun. 2019), "3rd Generation Partnership Project; Technical Specification Group Radio Access Network; NR; Physical channels and modulation (Release 15)," Jun. 2019, 97 pages.
Ericsson, "NR for Industrial Sensors (draft SID)," 3GPP TSG RAN Meeting #83, RP-190432, Shenzhen, China, Mar. 18-21, 2019, 4 pages.
Huawei, HiSilicon, "NR DL control capacity and blocking probability," 3GPP TSG RAN WG1 Meeting #90, R1-1714326, Prague, Czech Republic, Aug. 21-25, 2017, 2 pages.
Huawei, HiSilicon, "NR DL control capacity and blocking probability," 3GPP TSG RAN WG1 NR Ad Hoc Meeting, R1-1711415, Qingdao, China, Jun. 27-30, 2017, 2 pages.
PCT International Search Report and Written Opinion issued in International Application No. PCT/CN2019/100727 on Apr. 24, 2020, 13 pages (with English translation).
Extended European Search Report issued in European Application No. 19941730.4 on Sep. 27, 2022, 10 pages.

* cited by examiner

CONTROL CHANNEL TRANSMISSION METHOD AND APPARATUS

CROSS-REFERENCE TO RELATED APPLICATIONS

This application is a continuation of International Application No. PCT/CN2019/100727, filed on Aug. 15, 2019, the disclosure of which is hereby incorporated by reference in its entirety.

TECHNICAL FIELD

This application relates to the field of communication technologies, and in particular, to a control channel transmission method and an apparatus.

BACKGROUND

Some types of terminals in a communication system do not support high bandwidth and are terminals with a low bandwidth capability. For example, in machine communication, because a terminal is relatively sensitive to power consumption and/or costs, bandwidth supported by the terminal in machine communication is relatively low, to reduce the power consumption and/or costs. However, due to a limitation of a bandwidth capability, these terminals with a low bandwidth capability cannot ensure data receiving/sending performance. Therefore, how to improve data receiving/sending performance of the terminal with a low bandwidth capability becomes a problem that needs to be urgently resolved.

SUMMARY

Embodiments of this application provide a control channel transmission method and an apparatus.

According to a first aspect, an embodiment of this application provides a communication method. The method may be performed by a terminal, or may be performed by a component (for example, a processor, a chip, or a chip system) of a terminal. The method includes: determining a first control resource set, where a quantity of symbols included in the first control resource set in time domain is a positive integer less than or equal to M, and M is an integer greater than 3; and receiving control information on one or more resource elements in the first control resource set. Optionally, the first control resource set includes P subsets, and P is an integer greater than 1. Further optionally, all the P subsets include a same quantity of symbols in time domain.

In the foregoing method, a resource that can carry the control information is added, so that a terminal with a low bandwidth capability can support use of a relatively high aggregation level to receive/send the control information. Therefore, control information receiving/sending performance of the terminal with a low bandwidth capability is improved, for example, reliability of receiving/sending the control information can be improved. In addition, the foregoing method helps increase a transmission distance of the control information, so that coverage of the control information is enhanced.

With reference to the first aspect, in some implementations of the first aspect, numbers of a plurality of resource elements included in the first control resource set meet:
one subset in the P subsets includes a plurality of resource element sets, and one resource element set in the plurality of resource element sets includes K resource elements, where K is a positive integer, the K resource elements have consecutive numbers, and the numbers of the K resource elements meet a sequence of time domain first and then frequency domain; and numbers of resource elements in any two adjacent resource element sets in the plurality of resource element sets are non-consecutive; numbers of resource elements in at least two adjacent resource element sets in the plurality of resource element sets are non-consecutive; or numbers of resource elements in a part of two adjacent resource element sets in the plurality of resource element sets are non-consecutive, and numbers of resource elements in the other part of two adjacent resource element sets in the plurality of resource element sets are consecutive.

When the number is used, resource elements in the first control resource set can be alternately numbered (which may alternatively be understood as interleaved numbering) among a plurality of subsets or in a plurality of subsets, so that control resource utilization can be improved, and resource waste can be reduced, and therefore receiving/sending performance of the control information can be improved.

With reference to the first aspect, in some implementations of the first aspect, numbers of a plurality of resource elements included in the first control resource set meet:
a plurality of resource elements included in any one of the P subsets have consecutive numbers, and the numbers of the plurality of resource elements meet a sequence of time domain first and then frequency domain.

When the number is used, resource elements in the first control resource set can be numbered in a plurality of subsets in a centralized manner, to reduce dispersed resource elements and ensure effective utilization of the resource element.

Optionally, the control information is received on a plurality of resource elements in the first control resource set based on numbers of a part or all of resource elements included in any one of the foregoing first control resource sets.

With reference to the first aspect, in some implementations of the first aspect, when a first condition is met, the control information is received on one or more resource elements in the first control resource set, where the first condition includes one or more of the following:
a quantity of symbols included in the first control resource set in time domain is an integer greater than 3; and
the control information is not detected in a second control resource set, where the second control resource set is included in the first control resource set, a quantity of symbols included in the second control resource set in time domain is a positive integer less than or equal to L, and L is a positive integer less than M.

In the foregoing method, a condition for receiving the control information in the first control resource set is limited, so that the control information can be preferentially detected in a control resource set that includes a smaller quantity of symbols in time domain, time required for detecting the control information can be reduced, and power consumption of the terminal in detecting the control information can be reduced.

With reference to the first aspect, in some implementations of the first aspect, the first control resource set includes a plurality of resource element bundles (bundle), and any one of the plurality of resource element bundles includes J resource elements with consecutive numbers, where J is a positive integer. Optionally, the plurality of resource element bundles have consecutive numbers, and the numbers of the plurality of resource element bundles meet a sequence of time domain first and then frequency domain.

The numbers of the foregoing resource element bundles help implement precoding processing on the control information, so that receiving/sending performance of the control information is further improved.

According to a second aspect, an embodiment of this application provides a communication method. The method may be performed by a network device, or may be performed by a component (for example, a processor, a chip, or a chip system) of a network device, or the method may be performed by a terminal, or may be performed by a component (for example, a processor, a chip, or a chip system) of a terminal. The method includes: determining a first control resource set, where a quantity of symbols included in the first control resource set in time domain is a positive integer less than or equal to M, and M is an integer greater than 3; and sending control information on one or more resource elements in the first control resource set. Optionally, the first control resource set includes P subsets, and P is an integer greater than 1. Further optionally, all the P subsets include a same quantity of symbols in time domain.

In the foregoing method, a resource that can carry the control information is added, so that a terminal with a low bandwidth capability can support use of a relatively high aggregation level to receive/send the control information. Therefore, control information receiving/sending performance of the terminal with a low bandwidth capability is improved, for example, reliability of receiving/sending the control information can be improved. In addition, the foregoing method helps increase a transmission distance of the control information, so that coverage of the control information is enhanced.

With reference to the second aspect, in some implementations of the second aspect, numbers of a plurality of resource elements included in the first control resource set meet:
 one subset in the P subsets includes a plurality of resource element sets, and one resource element set in the plurality of resource element sets includes K resource elements, where K is a positive integer, the K resource elements have consecutive numbers, and the numbers of the K resource elements meet a sequence of time domain first and then frequency domain; and
 numbers of resource elements in any two adjacent resource element sets in the plurality of resource element sets are non-consecutive; numbers of resource elements in at least two adjacent resource element sets in the plurality of resource element sets are non-consecutive; or numbers of resource elements in a part of two adjacent resource element sets in the plurality of resource element sets are non-consecutive, and numbers of resource elements in the other part of two adjacent resource element sets in the plurality of resource element sets are consecutive.

When the number is used, resource elements in the first control resource set can be alternately numbered (which may alternatively be understood as interleaved numbering) among a plurality of subsets or in a plurality of subsets, so that control resource utilization can be improved, and resource waste can be reduced, and therefore receiving/sending performance of the control information can be improved.

With reference to the second aspect, in some implementations of the second aspect, numbers of a plurality of resource elements included in the first control resource set meet:
 a plurality of resource elements included in any one of the P subsets have consecutive numbers, and the numbers of the plurality of resource elements meet a sequence of time domain first and then frequency domain.

When the number is used, resource elements in the first control resource set can be numbered in a plurality of subsets in a centralized manner, to reduce dispersed resource elements and ensure effective utilization of the resource element.

Optionally, based on numbers of a part or all of resource elements included in any one of the foregoing first control resource sets, the control information is mapped on a plurality of resource elements in the first control resource set, and the control information is sent.

With reference to the second aspect, in some implementations of the second aspect, when a second condition is met, the control information is sent on one or more resource elements in the first control resource set, where the second condition includes one or more of the following:
 a quantity of symbols included in the first control resource set in time domain is an integer greater than 3; and
 the control information is not sent in a second control resource set, where the second control resource set is included in the first control resource set, a quantity of symbols included in the second control resource set in time domain is a positive integer less than or equal to L, and L is a positive integer less than M.

In the foregoing method, a condition for sending the control information in the first control resource set is limited, so that the control information can be preferentially sent in a control resource set that includes a smaller quantity of symbols in time domain, and time and power consumption required by the terminal to detect the control information can be reduced.

With reference to the second aspect, in some implementations of the second aspect, the first control resource set includes a plurality of resource element bundles (bundle), and any one of the plurality of resource element bundles includes J resource elements with consecutive numbers, where J is a positive integer. Optionally, the plurality of resource element bundles have consecutive numbers, and the numbers of the plurality of resource element bundles meet a sequence of time domain first and then frequency domain.

The numbers of the foregoing resource element bundles help implement precoding processing on the control information, so that receiving/sending performance of the control information is further improved.

According to a third aspect, an embodiment of this application provides an apparatus, and the apparatus may implement the method in any one of the first aspect or the possible implementations of the first aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a fourth aspect, an embodiment of this application provides an apparatus, and the apparatus may implement the method in any one of the second aspect or the possible implementations of the second aspect. The apparatus includes a corresponding unit or component configured to perform the foregoing method. The unit included in the apparatus may be implemented by using software and/or hardware. The apparatus may be, for example, a network device (for example, a base station), or a chip, a chip system, or a processor that can support the network device in implementing the foregoing method. The apparatus may be, for another example, a terminal, or a chip, a chip system, or a processor that can support the terminal in implementing the foregoing method.

According to a fifth aspect, an embodiment of this application provides an apparatus, including a processor, where the processor is coupled to a memory, the memory is configured to store a program or instructions, and when the processor executes the program or the instructions, the apparatus is enabled to implement the method in the first aspect or any possible implementation of the first aspect.

According to a sixth aspect, an embodiment of this application provides an apparatus, including a processor, where the processor is coupled to a memory, the memory is configured to store a program or instructions, and when the processor executes the program or the instructions, the apparatus is enabled to implement the method in the second aspect or any possible implementation of the second aspect.

According to a seventh aspect, an embodiment of this application provides a storage medium, and the storage medium stores a computer program or instructions. When the computer program or the instructions is/are executed, a computer is enabled to perform the method in the first aspect or any possible implementation of the first aspect.

According to an eighth aspect, an embodiment of this application provides a storage medium, and the storage medium stores a computer program or instructions. When the computer program or the instructions is/are executed, a computer is enabled to perform the method in the second aspect or any possible implementation of the second aspect.

According to a ninth aspect, an embodiment of this application provides a communication system, including the apparatus according to the third aspect and/or the apparatus according to the fourth aspect.

According to a tenth aspect, an embodiment of this application provides a communication system, including the apparatus according to the fifth aspect and/or the apparatus according to the sixth aspect.

DESCRIPTION OF EMBODIMENTS

Figure 1:
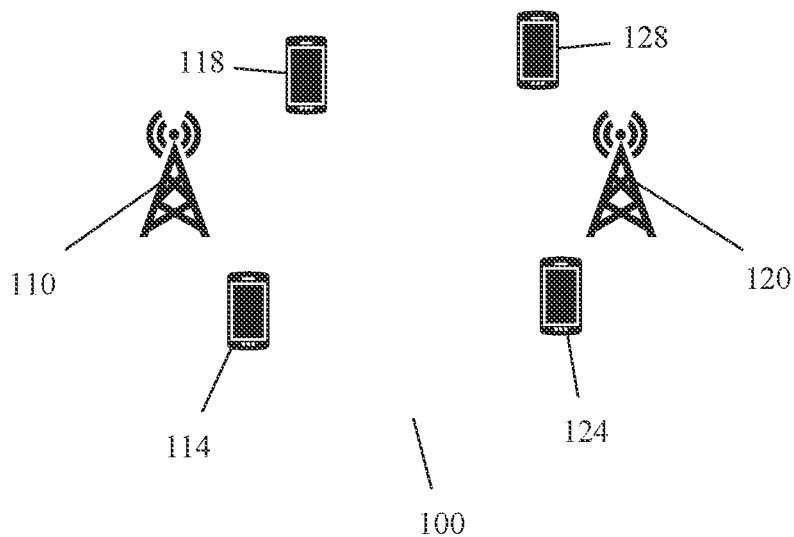
FIG. 1 is a schematic diagram of a communication system to which an embodiment of this application is applicable.

The communication method and apparatus that are provided in the embodiments of this application may be applied to a communication system. FIG. 1 is a schematic diagram of a structure of a communication system. The communication system 100 includes one or more network devices (for clarity, a network device 110 and a network device 120 are shown in the figure) and one or more terminals that communicate with the one or more network devices. A terminal 114 and a terminal 118 shown in FIG. 1 communicate with the network device 110, and a terminal 124 and a terminal 128 shown in FIG. 1 communicate with the network device 120. It may be understood that the network device and the terminal may also be referred to as communication devices.

Technologies described in the embodiments of the present application may be applied to various communication systems, such as a fourth generation (4G) communication system, a 4.5G communication system, a 5G communication system, a system integrated with a plurality of communications systems, or a future evolved communication system, for example, a long term evolution (LTE) system, a new radio (NR) system, a wireless fidelity (WiFi) system, a communication system related to the 3rd generation partnership project (3GPP), and another similar communication system.

Figure 2:
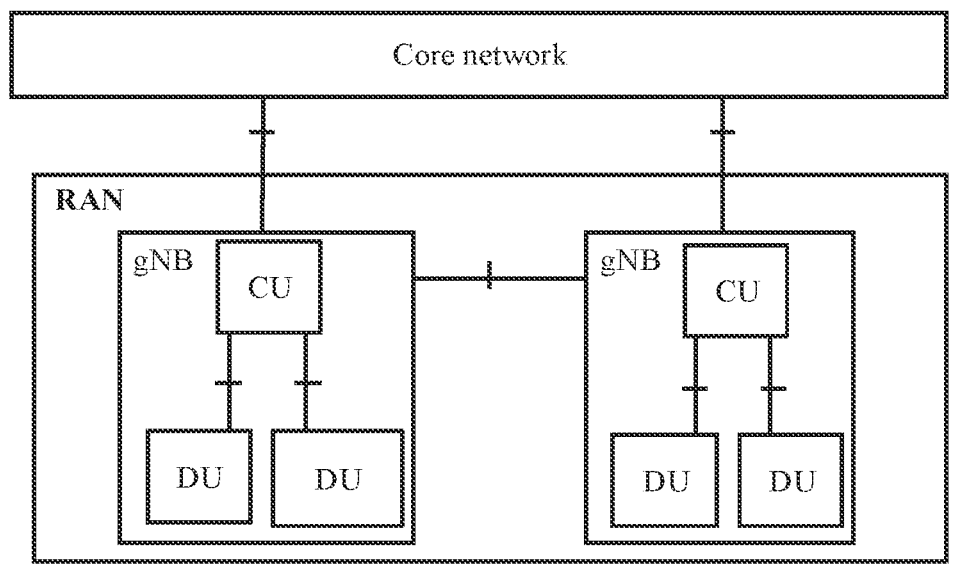
FIG. 2 is a schematic diagram of an example of an architecture of a communication system.

FIG. 2 is a schematic diagram of an example of a possible architecture of a communication system. As shown in FIG. 2, a network device in a radio access network (RAN) is a base station (such as a gNodeB or a gNB) with an architecture in which a centralized unit (CU) and a distributed unit (DU) are separated. The RAN may be connected to a core network (for example, an LTE core network or a 5G core network). The CU and the DU may be understood as division of a base station from the perspective of logical functions. The CU and the DU may be physically separated or deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (PDCP) layer and a radio resource control (RRC) layer are distributed to the CU, but functions of a radio link control (RLC) layer, a media access control (MAC) layer, and a physical layer are distributed to the DU. It may be understood that processing function division of the CU and the DU based on the protocol layers is merely an example, and there may be other division. For example, the CU or the DU may have functions of more protocol layers through division. For example, the CU or the DU may alternatively have some processing functions of protocol layers through division. In a design, some functions of the RLC layer and functions of a protocol layer above the RLC layer are distributed to the CU, and remaining functions of the RLC layer and functions of a protocol layer below the RLC layer are distributed to on the DU. In another design, functions of the CU or the DU may alternatively be obtained through division based on a service type or another system requirement. For example, division is performed based on a latency, functions whose processing time needs to meet a latency requirement are deployed on the DU, and functions whose processing time does not need to meet the latency requirement are deployed on the CU. A network architecture shown in FIG. 2 may be applied to a 5G communication system, and may alternatively share one or more components or resources with an LTE system. In another design, the CU may alternatively have one or more functions of the core network. One or more CUs may be disposed in a centralized manner or a separated manner. For example, the CUs may be disposed on a network side for ease of centralized management. The DU may have a plurality of radio frequency functions, or the radio frequency functions may be remotely set.

The function of the CU may be implemented by one entity, or may be used to further separate a control plane (CP) and a user plane (UP). To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided in this application are also applicable to an architecture in which the CU and the DU are not separated.

In this application, the network device may be any device having a wireless transceiver function. The network device includes but is not limited to: an evolved NodeB (NodeB or eNB or e-NodeB, evolved Node B) in LTE, a gNodeB (gNodeB or gNB) or a transmission reception point (transmission receiving point/transmission reception point, TRP) in NR, a base station that subsequently evolves in 3GPP, an access node in a WiFi system, a wireless relay node, a wireless backhaul node, or the like. The base station may be a macro base station, a micro base station, a picocell base station, a small cell, a relay station, a balloon station, or the like. A plurality of base stations may support the foregoing networks of a same technology, or may support the foregoing networks of different technologies. The base station may include one or more co-site or non-co-site TRPs. The network device may alternatively be a radio controller, a CU, and/or a DU in a cloud radio access network (CRAN) scenario. The network device may alternatively be a server, a wearable device, a machine communication device, a vehicle-mounted device, or the like. The following provides descriptions by using an example in which the network device is a base station. The plurality of network devices may be base stations of a same type, or may be base stations of different types. The base station may communicate with a terminal device, or may communicate with a terminal device via a relay station. The terminal device may communicate with a plurality of base stations using different technologies. For example, the terminal device may communicate with a base station supporting an LTE network, may communicate with a base station supporting a 5G network, and may further support a dual connection to a base station in an LTE network and a base station in a 5G network.

The terminal is a device having a wireless transceiver function. The terminal may be deployed on land, including indoor or outdoor, hand-held, wearable, or vehicle-mounted; may be deployed on a water surface (for example, on a ship); or may be deployed in the air (for example, on an airplane, a balloon, or a satellite). The terminal may be a mobile phone, a tablet computer (Pad), a computer with a wireless receiving/sending function, a virtual reality (VR) terminal device, an augmented reality (AR) terminal device, a terminal in industrial control, a vehicle-mounted terminal device, a terminal in self-driving, a terminal in assisted driving, a terminal in remote medical, a terminal in a smart grid, a terminal in transportation safety, a terminal in a smart city, a terminal in a smart home, a wearable terminal device, a terminal in machine communication, or the like. An application scenario is not limited in the embodiments of this application. The terminal may sometimes be referred to as a terminal device, user equipment (UE), an access terminal device, a vehicle-mounted terminal, an industrial control terminal, a UE unit, a UE station, a mobile site, a mobile station, a remote station, a remote terminal device, a mobile device, a UE terminal device, a wireless communication device, a machine terminal, a UE agent, a UE apparatus, or the like. The terminal may be fixed or mobile.

Some types of terminals in the communication system do not support high bandwidth and are terminals with a low bandwidth capability. For example, in machine communication, because a terminal is relatively sensitive to power consumption and/or costs, bandwidth supported by the terminal in machine communication is relatively low, to reduce the power consumption and/or costs. For example, bandwidth supported by a terminal for machine-type communication (MTC) in long term evolution (LTE) may be 1.4 MHz, and bandwidth supported by a terminal for narrow band internet of things (NB-IoT) may be 180 kHz or 200 kHz (including a guard band). For another example, bandwidth supported by a terminal with a relatively low bandwidth capability in new radio (NR) may be 3.6 MHz.

However, due to a limitation of a bandwidth capability, these terminals with a low bandwidth capability cannot ensure data receiving/sending performance. Therefore, how to improve data receiving/sending performance of the terminal with a low bandwidth capability becomes a problem that needs to be urgently resolved.

In the method provided in the embodiments of this application, a physical resource that carries control information of a terminal with a low bandwidth capability is extended, and the physical resource is properly divided, so that control information receiving/sending performance of the terminal with a low bandwidth capability can be improved, and therefore data receiving/sending performance of the terminal with a low bandwidth capability can be improved.

The physical resource (sometimes referred to as a resource for short) in this application may include one or more of a time domain resource, a frequency domain resource, a code domain resource, or a space domain resource. For example, the time domain resource included in the physical resource may include at least one frame, at least one subframe, at least one slot, at least one mini-slot, at least one time unit, or at least one time domain symbol. For example, the frequency domain resource included in the physical resource may include at least one carrier, at least one component carrier (CC), at least one bandwidth part (BWP), at least one resource block group (RBG), at least one physical resource block group (PRG), at least one resource block (RB), at least one subcarrier (SC), or the like. For example, the space domain resource included in the physical resource may include at least one beam, at least one port, at least one antenna port, at least one layer/space layer, or the like. For example, the code domain resource included in the physical resource may include at least one orthogonal cover code (OCC), at least one non-orthogonal multiple access (NOMA) code, or the like.

It may be understood that the physical resource may be a physical resource of a baseband, and the physical resource of the baseband may be used by a baseband chip. Alternatively, the physical resource may be a physical resource of an air interface. Alternatively, the physical resource may be a physical resource of an intermediate frequency or a radio frequency.

The following describes the technical solutions of this application in detail by using specific embodiments with reference to the accompanying drawings. The following embodiments and implementations may be combined with each other, and same or similar concepts or processes may not be described repeatedly in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and a memory coupled to the processor.

For ease of understanding of the embodiments of this application, some concepts or terms used in this application are first briefly described.

Symbol: A time length of one symbol is not limited in this application. For different subcarrier spacings, a time length of one symbol may be different. The symbol may include an uplink symbol and/or a downlink symbol. The uplink symbol may also be referred to as a single carrier-frequency division multiple access (SC-FDMA) symbol or an orthogonal frequency division multiplexing (OFDM) symbol. The downlink symbol may also be referred to as an OFDM symbol. It may be understood that the symbol in this application may alternatively correspond to another multiple access manner. For example, the symbol in this application may be a non-orthogonal multiple access symbol. This is not specifically limited in this application.

Resource element (RE): One RE includes one time domain symbol (such as an orthogonal frequency division multiplexing (OFDM) symbol) in time domain, and includes one subcarrier (SC) in frequency domain.

Resource block (RB): One RB includes $N_{sc}^{RB}$ consecutive SCs in frequency domain. For example, $N_{sc}^{RB}=12$, or $N_{sc}^{RB}$ may alternatively be another positive integer. This is not limited in this application. Alternatively, it may be understood that one RB includes $N_{sc}^{RB}$ consecutive REs in frequency domain.

Resource element group (REG): One REG includes one time domain symbol (such as an OFDM symbol) in time domain, and includes one RB in frequency domain. Alternatively, it may be understood that one REG includes one RB in one time domain symbol. Alternatively, it may be understood that a frequency range occupied by one REG in frequency domain is equal to a frequency range occupied by one RB in frequency domain. For example, one REG may include 12 consecutive subcarriers in frequency domain. It may be understood that when the 12 consecutive subcarriers include an RE for a transmission reference signal (such as a cell-specific reference signal (CRS) or a demodulation reference signal (DMRS)), a quantity of REs that can actually be used to transmit a downlink control channel is less than 12.

Control channel element (CCE): One CCE includes $N_{REG}^{CCE}$ REGs. For example, $N_{REG}^{CCE}=6$, or $N_{REG}^{CCE}$ may alternatively be another positive integer, and this is not limited in this application. $N_{REG}^{CCE}$ REGs included in one CCE (for example, infrequency domain or time domain) may be consecutive or non-consecutive, and this depends on a mapping rule between the CCE and the REG. For example, if the mapping rule between the CCE and the REG meets a non-interleaving mapping manner, the $N_{REG}^{CCE}$ REGs included in one CCE may be consecutive. For another example, if the mapping rule between the CCE and the REG meets an interleaving mapping manner, the $N_{REG}^{CCE}$ REGs included in one CCE may be non-consecutive.

REG bundle: One REG bundle includes a plurality of REGs. For example, one REG bundle includes two or six REGs. Generally, the REG bundle is used to map the CCE to the REG.

Control resource set (CORESET): One CORESET includes $N_{RB}^{CORESET}$ RBs in frequency domain, and includes $N_{symb}^{CORESET}$ time domain symbols (which are sometimes referred to as symbols for short, for example, OFDM symbols) in time domain, where $N_{RB}^{CORESET}$ and $N_{symb}^{CORESET}$ are positive integers. For example, $N_{symb}^{CORESET}$ may be 1, 2, or 3, or $N_{symb}^{CORESET}$ may alternatively be another positive integer, and this is not limited in this application. For example, $N_{RB}^{CORESET}$ may be 6, 12, 18, or 24, or $N_{RB}^{CORESET}$ may alternatively be another positive integer, and this is not limited in this application. The $N_{RB}^{CORESET}$ RBs included in one CORESET in frequency domain may be consecutive or non-consecutive.

REG bundle: One REG bundle includes $N_{REG}^{bund}$ REGs. For example, $N_{REG}^{bund}$ may be 2, 3, or 6, or $N_{REG}^{bund}$ may alternatively be another positive integer, and this is not limited in this application. For a DMRS-based PDCCH, the terminal may consider that same precoding is used in one REG bundle. In other words, the terminal may perform joint channel estimation in one REG bundle.

Aggregation level (AL): An aggregation level is a quantity of CCEs that carry control information, or may indicate a quantity of CCEs occupied by one control channel (for example, a quantity of consecutive CCEs). Alternatively, it may be understood that one downlink control channel is formed by aggregating AL_K CCEs. For example, AL_K may be 1, 2, 4, 8, or 16, or AL_K may alternatively be another positive integer, and this is not limited in this application. It may be understood that a control channel used to carry control information in this application may be a physical downlink control channel (PDCCH), an enhanced PDCCH (EPDCCH), an MTC PDCCH (MPDCCH), a narrowband PDCCH (NPDCCH), or another channel that is newly defined in a future communication protocol and that has a same or similar function as a downlink control channel. A type and a name of the control channel are not limited in this application. For ease of description in this application, a PDCCH is used as an example for description.

Optionally, the PDCCH in this application may alternatively be a CRS-based PDCCH or a DMRS-based PDCCH. The CRS-based PDCCH may be understood as a PDCCH that is demodulated based on a CRS. The DMRS-based PDCCH may be understood as a PDCCH that is demodulated based on a DMRS. The CRS is a reference signal (RS) configured by a network device for all terminals in a cell. The DMRS is an RS configured by the network device for one terminal, and may also be referred to as a user equipment-specific reference signal (UE-specific reference signal, URS). For same control information, a larger quantity of CCEs that carry the control information (which may also be understood as an AL used for the control information) indicates a larger quantity of physical resources that carry the control information and generally better receiving/sending performance of the control information. On the contrary, a smaller quantity of CCEs that carry the control information (which may also be understood as an AL used for the control information) indicates a smaller quantity of physical resources that carry the control information and generally worse receiving/sending performance of the control information.

A bandwidth capability of a terminal: A bandwidth capability of a terminal is a range of frequency resources that can be used when the terminal receives/sends information or data, or may be understood as maximum frequency bandwidth that can be used when the terminal receives/sends information or data. The bandwidth capability may include guard bandwidth, or may not include guard bandwidth. The bandwidth capability of the terminal may alternatively be understood as maximum channel bandwidth supported by the terminal.

A terminal with a low bandwidth capability: In this application, there may be a plurality of different types of understanding for a terminal with a low bandwidth capability.

A first type of understanding for the terminal with a low bandwidth capability is a terminal with a lower bandwidth capability in two types of terminals. For example, if a network supports at least two types of terminals: a first type of terminal and a second type of terminal, and a bandwidth capability of the first type of terminal is lower than a bandwidth capability of the second type of terminal, the first type of terminal may be considered as a terminal with a low bandwidth capability.

A second type of understanding for the terminal with a low bandwidth capability is as follows: If a bandwidth capability of a terminal is equal to minimum bandwidth for accessing a system, the terminal may be considered as a terminal with a low bandwidth capability. In this application, the minimum bandwidth required for accessing the system may be understood as transmission bandwidth (which may include guard bandwidth, or may not include guard bandwidth) corresponding to a signal/information that needs to be obtained by the terminal to access the system. For example, in the NR system, the signal/information that needs to be obtained to access the system includes a synchronization signal block (SSB) and/or system information. A maximum value in transmission bandwidth corresponding to the SSB and transmission bandwidth corresponding to system information may be used as minimum bandwidth required for accessing the NR system. The transmission bandwidth corresponding to the system information may be understood as transmission bandwidth corresponding to control information corresponding to the system information or transmission bandwidth corresponding to data information corresponding to the system information. Optionally, if the system information corresponds to a plurality of types of transmission bandwidth, a maximum value in minimum transmission bandwidth corresponding to the system information and the transmission bandwidth corresponding to the SSB may be used as the minimum bandwidth required for accessing the NR system.

A third type of understanding for the terminal with a low bandwidth capability is as follows: If a terminal does not support, in some CORESETs or a specific CORESET, transmission of control information of a relatively high aggregation level, the terminal may be considered as a terminal with a low bandwidth capability. The some CORESETs or the specific CORESET may be predefined, or may be configured by the network device for the terminal. The relatively high aggregation level may be predefined, or may be configured by the network device for the terminal. For example, the relatively high aggregation level may be 16 or 8, or may be another value.

It may be understood that there may be other understanding for the terminal with a low bandwidth capability in this application in addition to the foregoing three types of understanding. For example, a terminal whose bandwidth capability is less than a bandwidth threshold may be considered as the terminal with a low bandwidth capability, and the bandwidth threshold may be predefined or configured by the network device. A definition of the terminal with a low bandwidth capability is not limited in this application. When there are no special descriptions, the terminal in this application generally means a terminal with a low bandwidth capability, but content described in the method, apparatus, storage medium, or system in this application may also be applied to another type of terminal (for example, a terminal with a high bandwidth capability).

Due to sensitivity to power consumption and/or costs, a terminal with a low bandwidth capability in a communication system usually reduces a configuration level (such as an antenna configuration level) to reduce power consumption and/or costs. However, a relatively low bandwidth capability and a relatively low configuration level limit data receiving/sending performance of the terminal. For example, even a terminal that supports a relatively high aggregation level cannot support use of the relatively high aggregation level to receive/send control information, and consequently receiving/sending performance of the control information cannot be ensured. In the method provided in this embodiment of this application, a physical resource that carries control information of the terminal with a low bandwidth capability is extended, so that the terminal with a low bandwidth capability can support use of a relatively high aggregation level to receive/send the control information, to improve control information receiving/sending performance of the terminal with a low bandwidth capability.

Figure 3:
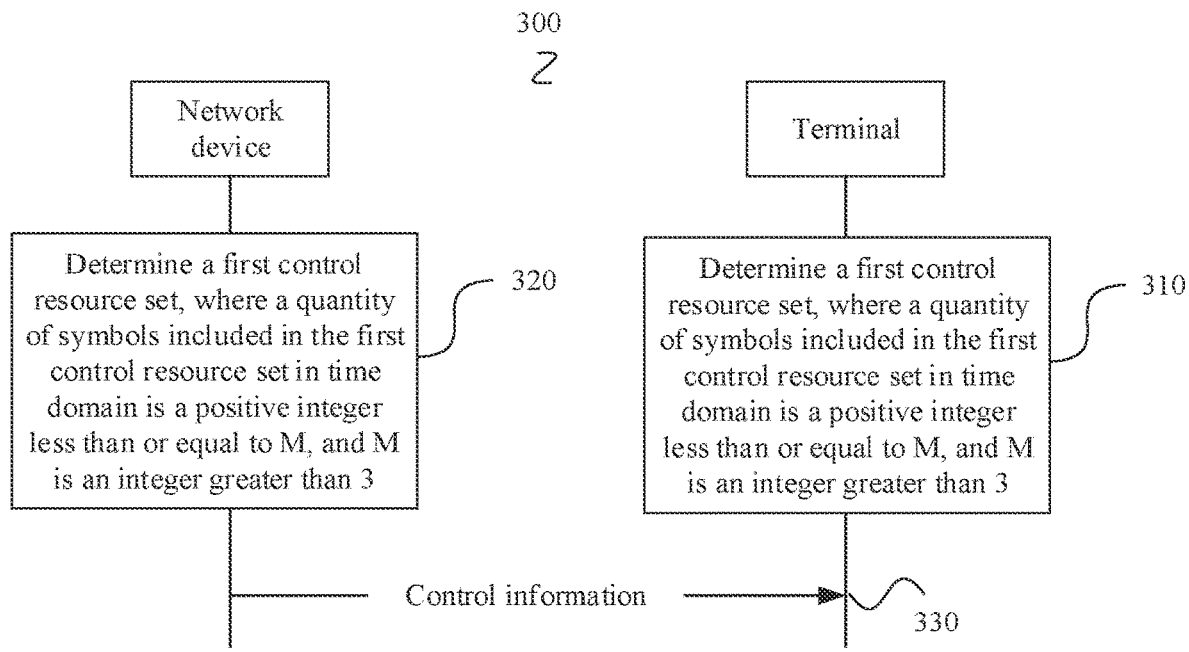
FIG. 3 is a schematic interaction diagram of a communication method according to an embodiment of this application.

FIG. 3 is a schematic interaction diagram of a communication method 300 according to an embodiment of this application. In FIG. 3, for example, a terminal and a network device are used as entities for executing the schematic interaction diagram, to show the communication method. However, this application does not limit the entities for executing the schematic interaction diagram. For example, the entities for executing the schematic interaction diagram may alternatively be one terminal and another terminal. For another example, the network device in FIG. 3 may alternatively be a chip, a chip system, or a processor that supports the network device in implementing the method, and the terminal in FIG. 3 may alternatively be a chip, a chip system, or a processor that supports the terminal in implementing the method. It may be understood that the embodiment described in FIG. 3 may be implemented as a separate implementation, and may be combined with another embodiment and/or implementation of this application without a conflict, to generate a new embodiment and/or implementation.

As shown in FIG. 3, a method 300 in this embodiment may include the following parts.

Part 310: A terminal determines a first control resource set, where a quantity of symbols included in the first control resource set in time domain is a positive integer less than or equal to M, and M is an integer greater than 3.

Part 320: A network device determines a first control resource set, where a quantity of symbols included in the first control resource set in time domain is a positive integer less than or equal to M, and M is an integer greater than 3. There may alternatively be other understanding for the first control resource set in the part 310 and the part 320. For example, the first control resource set may alternatively be understood as follows: A maximum value of a quantity of one or more first candidate symbols in the first control resource set in time domain is greater than a maximum value (for example, 3) of a quantity of one or more candidate symbols in another control resource set in time domain; or may be understood as follows: A quantity of one or more first candidate symbols in the first control resource set in time domain is a positive integer less than or equal to M, and a quantity of one or more candidate symbols in another control resource set in time domain is a positive integer less than or equal to N, where M is an integer greater than N, and N is a positive integer, for example, N is 3.

An execution sequence of the part 310 and the part 320 is not limited in this application. For example, the part 310 may be executed before the part 320. For another example, the part 320 may be executed before the part 310. For another example, the part 310 and the part 320 may be executed simultaneously.

Part 330: The network device sends control information on one or more resource elements in the first control resource set, and the terminal receives the control information on the one or more resource elements in the first control resource set.

The control resource set in this application may be understood as a candidate resource that may carry the control information. For example, the control resource set may be a CORESET or search space. The resource element in this application may be understood as a resource included in the control resource set. For example, the resource element may be a REG, an RB, or an RE included in the CORESET.

In the following descriptions, for example, the control resource set is a CORESET, to describe the method shown in FIG. 3 in detail.

In the part 310 and the part 320, a quantity of symbols included in a first CORESET in time domain is a positive integer less than or equal to M, where M is an integer greater than 3.

Figure 4A:
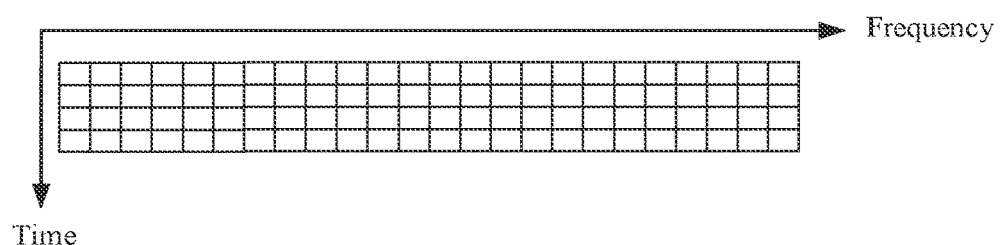
FIG. 4A is a schematic diagram of a possible time-frequency resource of a first control resource set.

FIG. 4A is used as an example. FIG. 4A shows a possible example of the first CORESET. The first CORESET includes four symbols in time domain and 24 RBs in frequency domain. Alternatively, it may be understood that the first CORESET includes 4×24=96 REGs. A quantity of first candidate symbols in the first CORESET in time domain is a positive integer less than or equal to M, where M is an integer greater than 3. For example, M is equal to 4, and the quantity of first candidate symbols in the first CORESET in time domain includes one or more of 1, 2, 3, and 4. For another example, M is equal to 5, and the quantity of first candidate symbols in the first CORESET in time domain includes one or more of 1, 2, 3, 4, and 5. A quantity of symbols included in the first CORESET in time domain is one of a quantity of the foregoing one or more first candidate symbols. For example, the first CORESET shown in FIG. 4A includes four symbols in time domain. M may alternatively be another integer greater than 3, for example, 6, 7, 8, or 9. This is not limited in this application.

The first CORESET in the part 310 and the part 320 may alternatively be understood as follows: A maximum value of a quantity of first candidate symbols in the first CORESET in time domain is greater than a maximum value of a quantity of candidate symbols in another CORESET in time domain; or may be understood as follows: A quantity of first candidate symbols in the first CORESET in time domain is a positive integer less than or equal to M (which may be understood as a maximum value of the quantity of first candidate symbols in the first CORESET in time domain), and a quantity of candidate symbols in another CORESET in time domain is a positive integer less than or equal to N (which may be understood as a maximum value of the quantity of candidate symbols in the another CORESET in time domain), where M is an integer greater than N, and N is a positive integer.

Figure 4B:
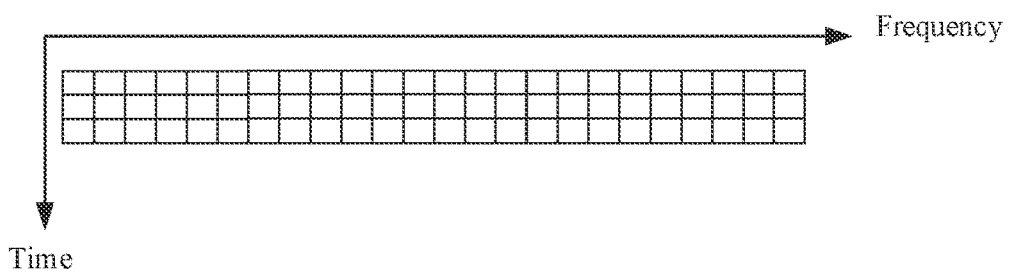
FIG. 4B is a schematic diagram of a possible time-frequency resource of another control resource set.

FIG. 4A and FIG. 4B are used as examples. FIG. 4A shows a possible example of the first CORESET. The first CORESET includes four symbols in time domain and 24 RBs in frequency domain. Alternatively, it may be understood that the first CORESET includes 4×24=96 REGs. FIG. 4B shows a possible example of another CORESET. The another CORESET includes three symbols in time domain and 24 RBs in frequency domain. Alternatively, it may be understood that the another CORESET includes 3×24=72 REGs. A quantity of first candidate symbols in the first CORESET in time domain is a positive integer less than or equal to M (which may be understood as a maximum value of the quantity of first candidate symbols in the first CORESET in time domain), and a quantity of candidate symbols in the another CORESET in time domain is a positive integer less than or equal to N (which may be understood as a maximum value of the quantity of candidate symbols in the another CORESET in time domain), where M is an integer greater than N, and N is a positive integer. For example, M is equal to 4, and N=3. The quantity of first candidate symbols in the first CORESET in time domain includes one or more of 1, 2, 3, and 4, and the quantity of candidate symbols of another type in the another CORESET in time domain includes one or more of 1, 2, and 3. For another example, M is equal to 5, and N=3. The quantity of first candidate symbols in the first CORESET in time domain includes one or more of 1, 2, 3, 4, and 5, and the quantity of candidate symbols of another type in the another CORESET in time domain includes one or more of 1, 2, and 3. For example, the first CORESET shown in FIG. 4A includes four symbols in time domain, and the another CORESET shown in FIG. 4B includes three symbols in time domain. M may alternatively be another integer greater than 3, for example, 6, 7, 8, or 9. This is not limited in this application.

In the part 330, the network device sends the control information on one or more resource elements in the first CORESET, and the terminal receives the control information on the one or more resource elements in the first CORESET. For example, the one or more resource elements may be one or more REGs included in the first CORESET. Optionally, the REG is included in one or more CCEs. For another example, the one or more resource elements may be one or more RBs included in the first CORESET.

Compared with the another CORESET in FIG. 4B, in the first CORESET in FIG. 4A, a resource that can carry the control information is extended. The first CORESET in this application may be understood as a CORESET that is newly designed to extend the resource that carries the control information, and the another CORESET may be understood as a previously supported CORESET. Therefore, in the method described in FIG. 3, the resource that can carry the control information is added, so that a terminal with a low bandwidth capability can support use of a relatively high aggregation level to receive/send the control information. Therefore, control information receiving/sending performance of the terminal with a low bandwidth capability is improved, for example, reliability of receiving/sending the control information can be improved. It may be understood that adding the resource that carries the control information is also conducive to a distance that can be reached by transmission of the control information. This is because if an information bit of the transmitted control information remains unchanged, adding the resource that carries the control information is equivalent to improving a corresponding channel condition during transmission of the control information, and therefore, the control information is transmitted farther. Therefore, in the method provided in this application, a coverage distance of transmission of the control information may be further increased. Therefore, regardless of a bandwidth capability of the terminal, in the method provided in this application, remote coverage of transmission of the control information can be implemented.

Figure 5:
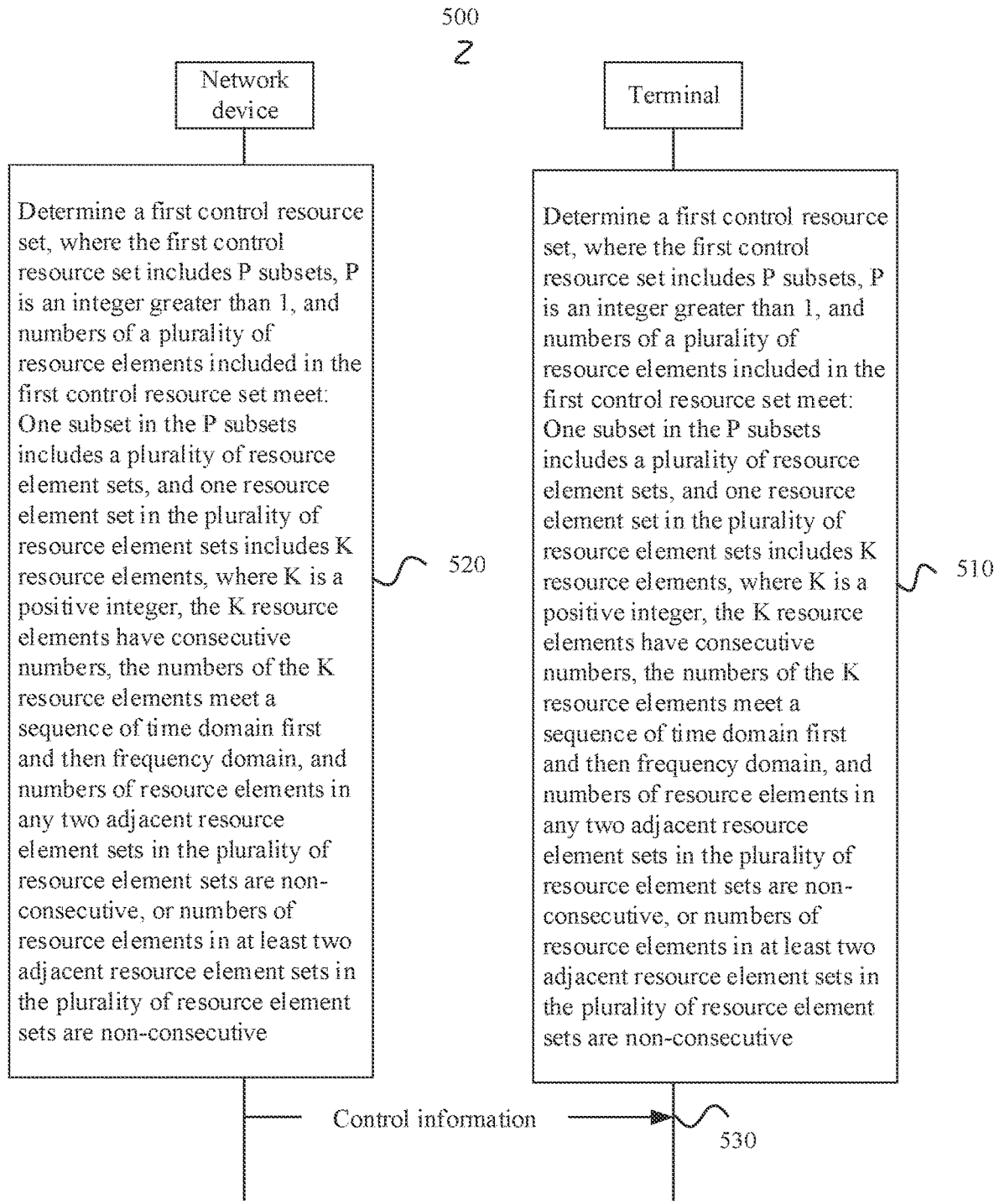
FIG. 5 is a schematic interaction diagram of another communication method according to an embodiment of this application.

FIG. 5 is a schematic interaction diagram of a communication method 500 according to an embodiment of this application. In FIG. 5, for example, a terminal and a network device are used as entities for executing the schematic interaction diagram, to show the communication method. However, this application does not limit the entities for executing the schematic interaction diagram. For example, the entities for executing the schematic interaction diagram may alternatively be one terminal and another terminal. For another example, the network device in FIG. 5 may alternatively be a chip, a chip system, or a processor that supports the network device in implementing the method, and the terminal in FIG. 5 may alternatively be a chip, a chip system, or a processor that supports the terminal in implementing the method. It may be understood that the embodiment described in FIG. 5 may be implemented as a separate implementation, and may alternatively be combined with another embodiment and/or implementation of this application without a conflict, to generate a new embodiment and/or implementation.

As shown in FIG. 5, a method 500 in this embodiment may include the following parts.

Part 510: A terminal determines a first control resource set, where the first control resource set includes P subsets, and P is an integer greater than 1. Numbers of a plurality of resource elements included in the first control resource set meet: One subset in the P subsets includes a plurality of resource element sets, and one resource element set in the plurality of resource element sets includes K resource elements, where K is a positive integer, the K resource elements have consecutive numbers, the numbers of the K resource elements meet a sequence of time domain first and then frequency domain, and numbers of resource elements in any two adjacent resource element sets in the plurality of resource element sets are non-consecutive, or numbers of resource elements in at least two adjacent resource element sets in the plurality of resource element sets are non-consecutive.

It may be understood that all the plurality of resource element sets may include a same quantity of resource elements, for example, each resource element includes K resource elements. Alternatively, a quantity of resource elements included in at least one (that is, may be more than one) resource element set in the plurality of resource element sets is different from a quantity of resource elements included in another resource element set in the plurality of resource element sets. For example, the quantity of resource elements included in at least one (that is, may be more than one) resource element set in the plurality of resource element sets is K_S, and a quantity of resource elements included in a resource element set in the plurality of resource element sets include other than the at least one resource element set is K, where K_S is a positive integer that is not equal to K, and K_S may be greater than K, or K_S may be less than K. Alternatively, different resource element sets in the plurality of resource element sets include different quantities of resource elements.

Part 520: A network device determines a first control resource set, where the first control resource set includes P subsets, and P is an integer greater than 1. Numbers of a plurality of resource elements included in the first control resource set meet: One subset in the P subsets includes a plurality of resource element sets, and one resource element set in the plurality of resource element sets includes K resource elements, where K is a positive integer, the K resource elements have consecutive numbers, the numbers of the K resource elements meet a sequence of time domain first and then frequency domain, and numbers of resource elements in at least two adjacent resource element sets in the plurality of resource element sets are non-consecutive, or numbers of resource elements in at least two adjacent resource element sets in the plurality of resource element sets are non-consecutive.

It may be understood that distribution of two adjacent resource element sets in a subset is not limited in this application. In other words, in this application, in a subset in the P subsets, two adjacent resource element sets may be consecutively distributed in frequency domain, or may be dispersedly distributed (for example, when there is a resource element that does not belong to the first control resource set in two resource element sets, and there is no other resource element set in the two resource element sets, the two resource element sets may also be understood as being adjacent) in frequency domain. It may be understood that a value of K may be predefined, or may be configured by using information and/or signaling (for example, configured by using higher layer signaling and/or downlink control information). In this application, the higher layer signaling may be, for example, RRC signaling or media access control (MAC) signaling, and the downlink control information may be, for example, information carried on a downlink control channel.

An execution sequence of the part 510 and the part 520 is not limited in this application. For example, the part 510 may be executed before the part 520. For another example, the part 520 may be executed before the part 510. For another example, the part 510 and the part 520 may be executed simultaneously.

Part 530: The network device sends control information on one or more resource elements in the first control resource set, and the terminal receives the control information on the one or more resource elements in the first control resource set. Optionally, the network device sends the control information on the one or more resource elements in the first control resource set based on the number described in the part 520, and the terminal receives the control information on the one or more resource elements in the first control resource set based on the number described in the part 510.

Sending the control information based on the number in this application may also be understood as mapping the control information to the resource element based on the number of the resource element and sending the control information.

Receiving the control information based on the number may also be understood as receiving the control information on the resource element based on the number of the resource element.

In the method 500 described in FIG. 5, the resource elements in the first control resource set are alternately numbered (which may alternatively be understood as interleaved numbering) among a plurality of subsets, so that control resource utilization can be improved, and therefore receiving/sending performance of the control information can be improved.

In the following descriptions, for example, the control resource set is a CORESET, and the resource element is a REG, to describe the method shown in FIG. 5 in detail.

In the part 510 and the part 520, the first CORESET includes P subsets, and the first CORESET includes a plurality of REGs, where P is an integer greater than 1. Numbers of the plurality of REGs included in the first CORESET meet: One subset in the P subsets includes a plurality of REG sets, and one REG set in the plurality of REG sets include K REGs, where K is a positive integer (for example, K is 1, 2, 3, 4, 5, 6, 7, 8, 9, or 10), the K REGs have consecutive numbers, the numbers of the K REGs meet a sequence of time domain first and then frequency domain, and numbers of REGs in any two adjacent REG sets in the plurality of REG sets are non-consecutive, or numbers of REGs in at least two adjacent REG sets in the plurality of REG sets are non-consecutive. Optionally, REGs separately included in the P subsets do not overlap each other. Optionally, all the P subsets include a same quantity of symbols in time domain, or at least two subsets in the P subsets include different quantities of symbols in time domain. Optionally, any two adjacent REG sets in the plurality of REG sets are two REG sets that are adjacent in frequency domain. Optionally, a value of K is equal to a quantity $N_{REG}^{CCE}$ of REGs included in one CCE.

In a possible implementation of the P subsets in the method 500, all the P subsets include a same quantity of symbols in time domain, any one of the P subsets includes a plurality of REG sets, any one of the plurality of REG sets includes K REGs, the K REGs have consecutive numbers, the numbers of the K REGs meet a sequence of time domain first and then frequency domain, and numbers of REGs in any two adjacent REG sets in the plurality of REG sets are non-consecutive. In this implementation, all the P subsets include a same quantity of REG sets.

Figure 6A:
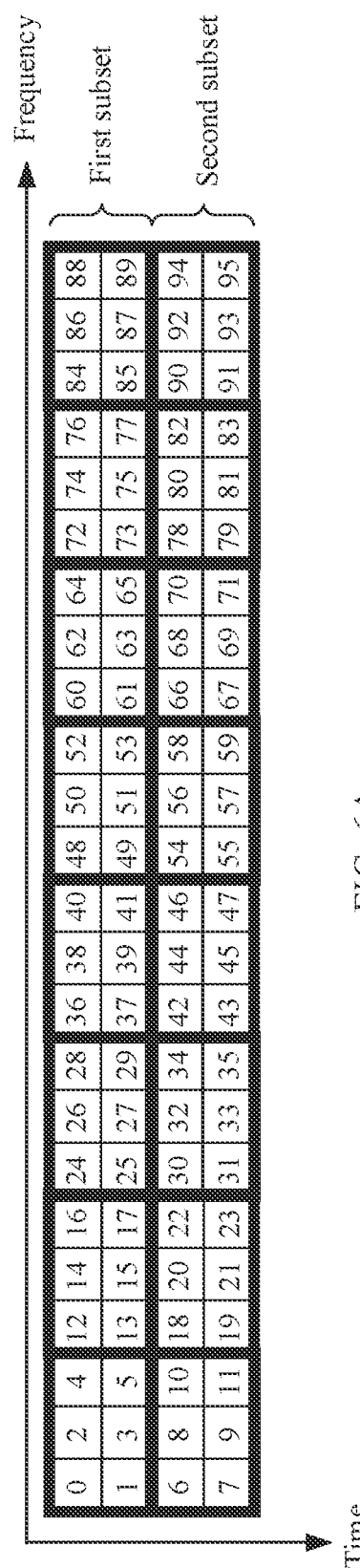
FIG. 6A to FIG. 6G are schematic diagrams of some possible numbers of resource elements in a first control resource set.

FIG. 6A is used as an example to describe a number of a REG in the first CORESET. FIG. 6A shows a possible example of the first CORESET. The first CORESET includes four symbols in time domain and 24 RBs in frequency domain. Alternatively, it may be understood that the first CORESET includes 4×24=96 REGs, and a number of each REG is shown in FIG. 6A. The first CORESET includes P=2 subsets, a first subset includes 48 REGs on a first symbol and a second symbol, and a second subset includes 48 REGs on a third symbol and a fourth symbol. The first subset and the second subset each include eight REG sets, as shown in bold black frames in FIG. 6A. The first subset and the second subset shown in FIG. 6A include a same quantity of symbols in time domain; in other words, the first subset and the second subset each include two symbols in time domain.

For example, any one of the eight REG sets included in the first subset includes K=6 REGs with consecutive numbers, the numbers of the K=6 REGs meet a sequence of time domain first and then frequency domain, and numbers of REGs in any two adjacent REG sets are non-consecutive in frequency domain. For example, numbers of REGs in a first REG set are {0, 1, 2, 3, 4, 5}, and meet a numbering sequence of time domain first and then frequency domain. Numbers of REGs in a second REG set adjacent to the first REG set in frequency domain are {12, 13, 14, 15, 16, 17}, and meet the numbering sequence of time domain first and then frequency domain. The numbers {0, 1, 2, 3, 4, 5} of the REGs in the first REG set and the numbers {12, 13, 14, 15, 16, 17} of the REGs in the second REG set are non-consecutive. The numbers of the REGs in the second subset have same features as the numbers of the REGs in the first subset. Details are not described herein again.

In another possible implementation of the P subsets in the method 500, all the P subsets include a same quantity of symbols in time domain, and any one of the P subsets includes W REG sets, where W is an integer greater than 1. Any one of W−1 REG sets in the W REG sets includes K REGs, the K REGs have consecutive numbers, and the numbers of the K REGs meet a sequence of time domain first and then frequency domain. A REG set other than the W−1 REG sets in the W REG sets includes K' REGs, the K' REGs have consecutive numbers, and the numbers of the K' REGs meet the sequence of time domain first and then frequency domain. In addition, numbers of REGs in any two adjacent REG sets in the foregoing W REG sets are non-consecutive. K' is a positive integer less than K, or K' is a positive integer greater than K. In this implementation, all the P subsets include a same quantity of REG sets.

Figure 6B:
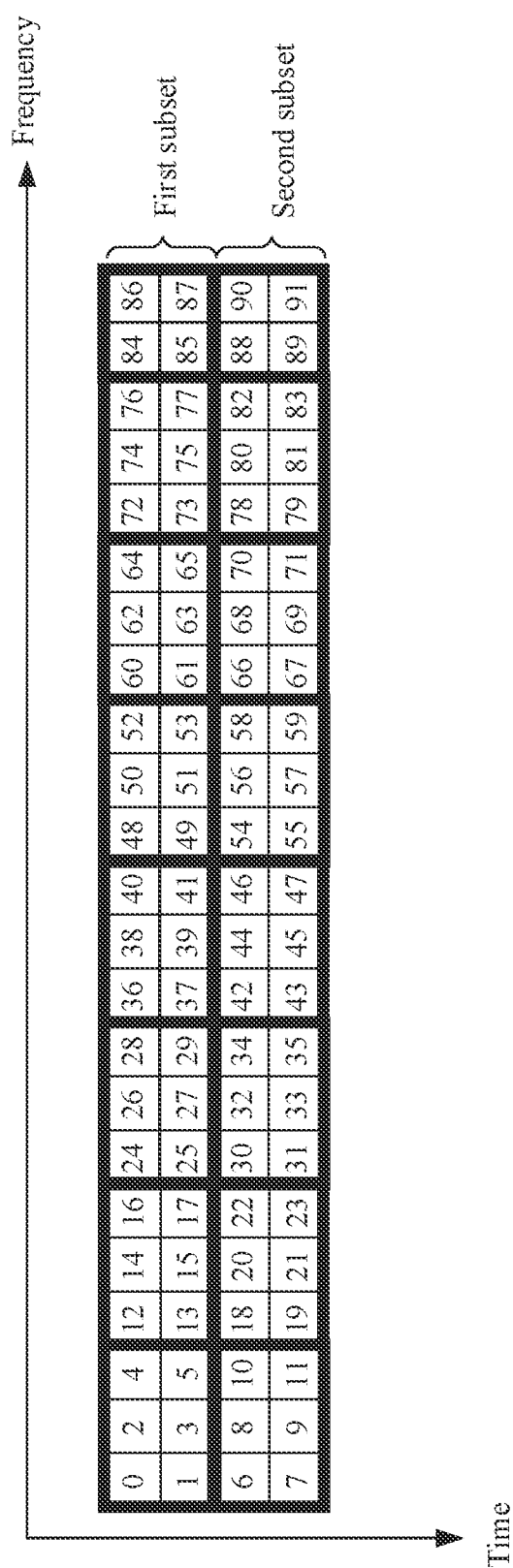

FIG. 6B is used as an example to describe a number of a REG in the first CORESET. FIG. 6B shows another possible example of the first CORESET. The first CORESET includes four symbols in time domain and 23 RBs in frequency domain. Alternatively, it may be understood that the first CORESET includes 4×23=92 REGs, and a number of each REG is shown in FIG. 6B. The first CORESET includes P=2 subsets, a first subset includes 46 REGs on a first symbol and a second symbol, and a second subset includes 46 REGs on a third symbol and a fourth symbol. The first subset and the second subset each include W=8 REG sets, as shown in bold black frames in FIG. 6B. The first subset and the second subset shown in FIG. 6B include a same quantity of symbols in time domain; in other words, the first subset and the second subset each include two symbols in time domain.

For example, any one of W−1=7 REG sets (first seven REG sets shown in FIG. 6B) in the W=8 REG sets included in the first subset includes K=6 REGs with consecutive numbers, and the numbers of the K=6 REGs meet a sequence of time domain first and then frequency domain. A REG set (a last REG set shown in FIG. 6B) in the first subset other than the foregoing seven REG sets includes K'=4 REGs with consecutive numbers. In addition, numbers of REGs in any two adjacent REG sets in the foregoing W=8 REG sets are non-consecutive. The numbers of the REGs in the second subset have same features as the numbers of the REGs in the first subset. Details are not described herein again.

Figure 6C:
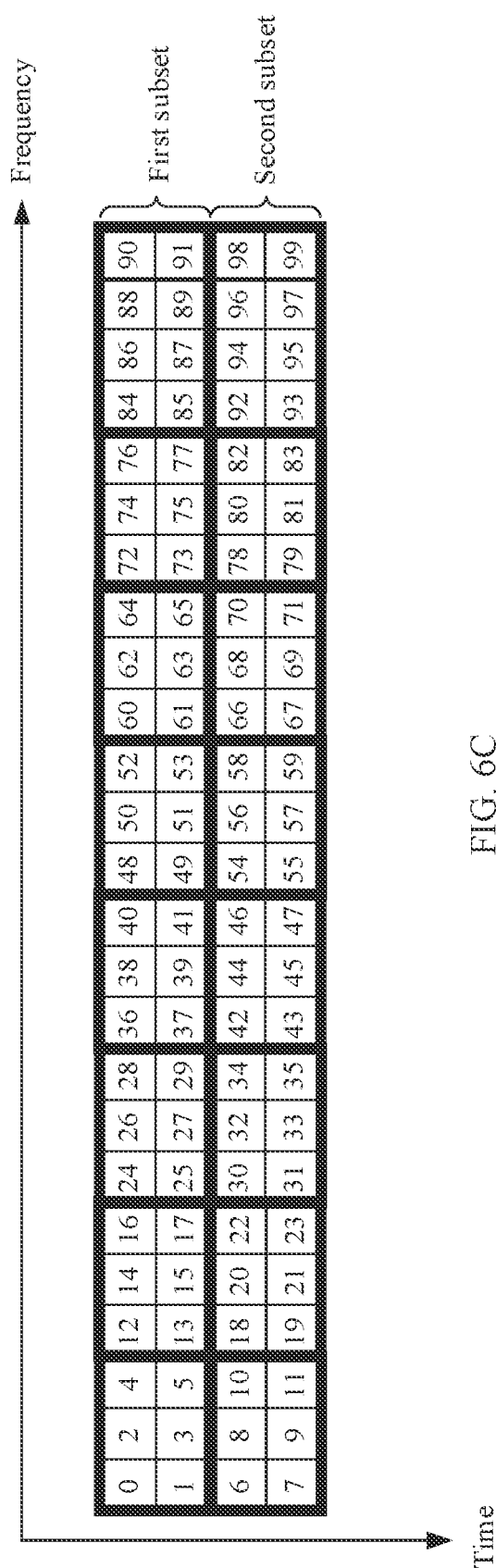

FIG. 6C is used as an example to describe a number of a REG in the first CORESET. FIG. 6C shows another possible example of the first CORESET. The first CORESET includes four symbols in time domain and 25 RBs in frequency domain. Alternatively, it may be understood that the first CORESET includes 4–25=100 REGs, and a number of each REG is shown in FIG. 6C. The first CORESET includes P=2 subsets, a first subset includes 50 REGs on a first symbol and a second symbol, and a second subset includes 50 REGs on a third symbol and a fourth symbol. The first subset and the second subset each include W=8 REG sets, as shown in bold black frames in FIG. 6C. The first subset and the second subset shown in FIG. 6C include a same quantity of symbols in time domain; in other words, the first subset and the second subset each include two symbols in time domain.

For example, any one of W−1=7 REG sets (first seven REG sets shown in FIG. 6C) in the W=8 REG sets included in the first subset includes K=6 REGs with consecutive numbers, and the numbers of the K=6 REGs meet a sequence of time domain first and then frequency domain. A REG set (a last REG set shown in FIG. 6C) in the first subset other than the foregoing seven REG sets includes K'=8 REGs with consecutive numbers. In addition, numbers of REGs in any two adjacent REG sets in the foregoing W=8 REG sets are non-consecutive. The numbers of the REGs in the second subset have same features as the numbers of the REGs in the first subset. Details are not described herein again.

In another possible implementation of the P subsets in the method 500, at least two subsets in the P subsets include different quantities of symbols in time domain, any one of the P subsets includes a plurality of REG sets, any one of the plurality of REG sets includes K REGs, the K REGs have consecutive numbers, the numbers of the K REGs meet a sequence of time domain first and then frequency domain, and numbers of REGs in at least two adjacent REG sets in the plurality of REG sets are non-consecutive. In this implementation, at least two subsets in the P subsets include different quantities of REG sets.

Figure 6D:
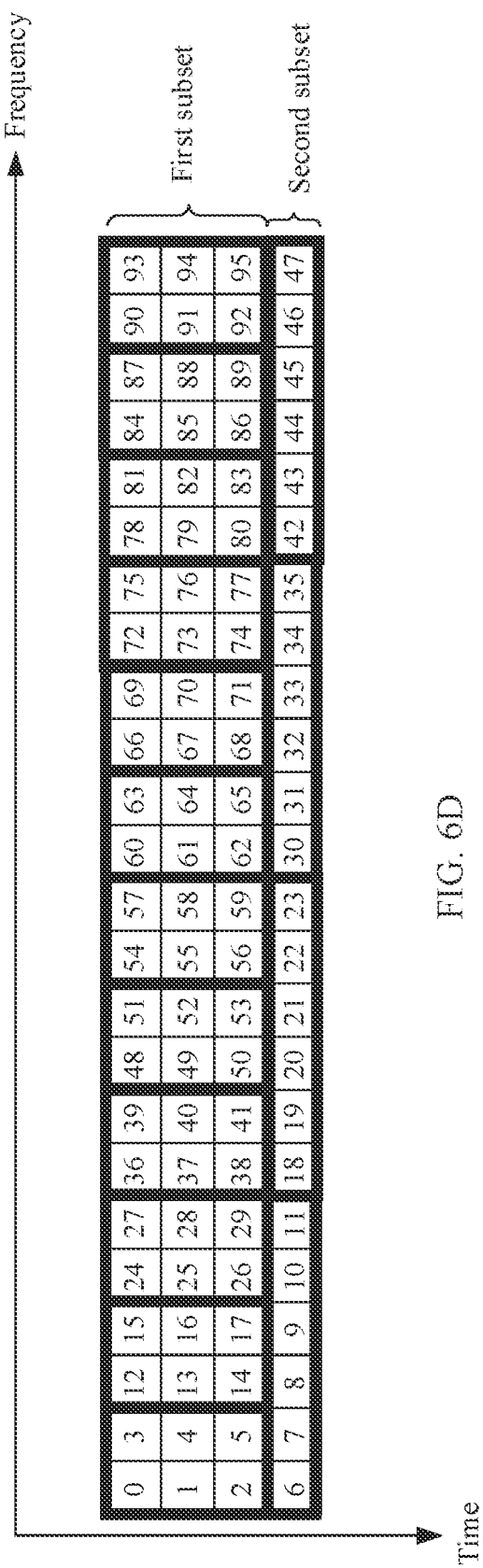

FIG. 6D is used as an example to describe a number of a REG in the first CORESET. FIG. 6D shows another possible example of the first CORESET. The first CORESET includes four symbols in time domain and 24 RBs in frequency domain. Alternatively, it may be understood that the first CORESET includes 4×24=96 REGs, and a number of each REG is shown in FIG. 6D. The first CORESET includes P=2 subsets, a first subset includes 72 REGs on a first symbol, a second symbol, and a third symbol, and a second subset includes 24 REGs on a fourth symbol. The first subset and the second subset respectively include 12 REG sets and four REG sets, as shown in bold black frames in FIG. 6D. The first subset and the second subset shown in FIG. 6D include different quantities of symbols in time domain; in other words, the first subset and the second subset respectively include three symbols and one symbol in time domain.

For example, any one of the 12 REG sets included in the first subset includes K=6 REGs with consecutive numbers, the numbers of the K=6 REGs meet a sequence of time domain first and then frequency domain, and numbers of REGs in at least two adjacent REG sets are non-consecutive in frequency domain, for example, numbers of REGs in first five adjacent REG sets in the first subset shown in FIG. 6D are non-consecutive. Any one of the four REG sets included in the second subset includes K=6 REGs with consecutive numbers, the numbers of the K=6 REGs meet the sequence of time domain first and then frequency domain, and numbers of REGs in at least two adjacent REG sets are non-consecutive in frequency domain, for example, numbers of REGs in four adjacent REG sets in the second subset shown in FIG. 6D are non-consecutive.

FIG. 6A to FIG. 6D show numbers of REGs in the first CORESET by using an example in which the first CORESET includes four symbols in time domain. However, a quantity of symbols included in the first CORESET in time domain is not limited. When the first CORESET includes another quantity of symbols in time domain, the method shown in FIG. 5 is also applicable.

Figure 6E:
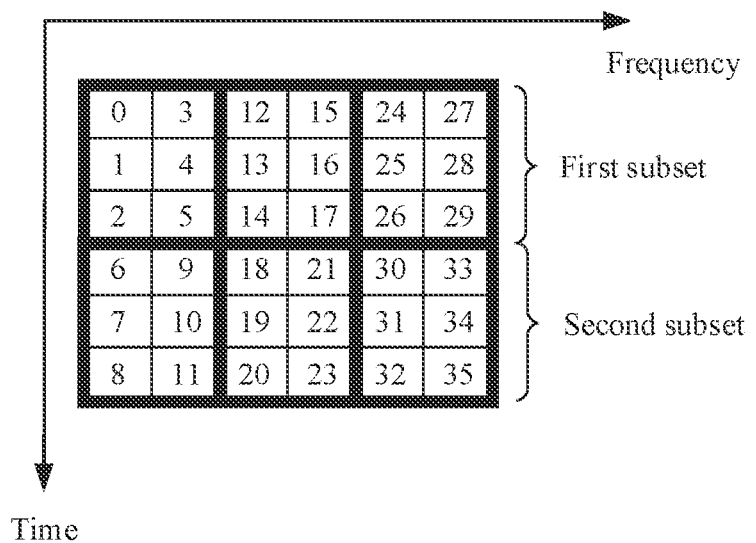
Figure 6F:
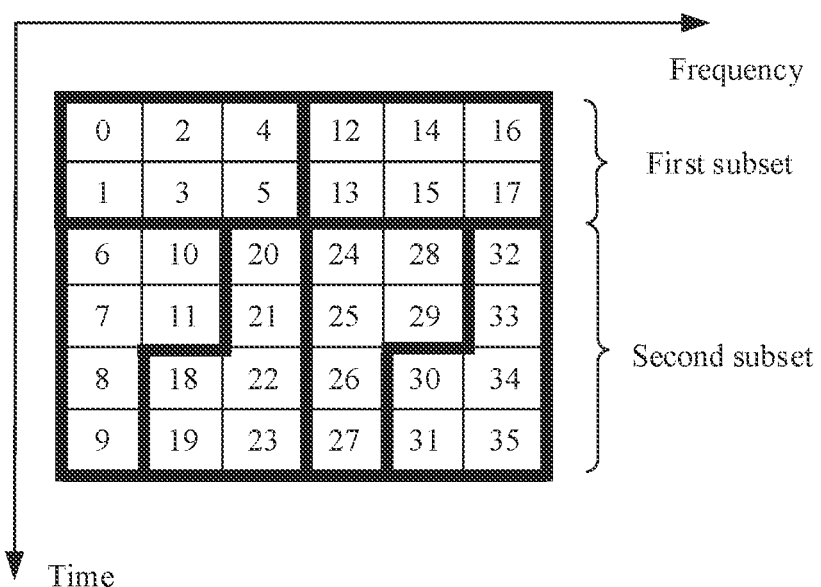

FIG. 6E and FIG. 6F are used as examples below to describe a number of a REG in the first CORESET when the first CORESET includes another quantity of symbols in time domain.

FIG. 6E shows another possible example of the first CORESET. The first CORESET includes six symbols in time domain and six RBs in frequency domain. Alternatively, it may be understood that the first CORESET includes 6×6=36 REGs, and a number of each REG is shown in FIG. 6E. The first CORESET includes P=2 subsets, a first subset includes 18 REGs on a first symbol, a second symbol, and a third symbol, and a second subset includes 18 REGs on a fourth symbol, a fifth symbol, and a sixth symbol. The first subset and the second subset each include three REG sets, as shown in bold black frames in FIG. 6E. The first subset and the second subset shown in FIG. 6E include a same quantity of symbols in time domain; in other words, the first subset and the second subset each include three symbols in time domain.

For example, any one of the three REG sets included in the first subset includes K=6 REGs with consecutive numbers, the numbers of the K=6 REGs meet a sequence of time domain first and then frequency domain, and numbers of REGs in any two adjacent REG sets are non-consecutive in frequency domain. For example, numbers of REGs in a second REG set are {12, 13, 14, 15, 16, 17}, and meet a numbering sequence of time domain first and then frequency domain. Numbers of REGs in a third REG set adjacent to the second REG set in frequency domain are {24, 25, 26, 27, 28, 29}, and meet the numbering sequence of time domain first and then frequency domain. Numbers of REGs in a first REG set adjacent to the second REG set in frequency domain are {0, 1, 2, 3, 4, 5}, and meet the numbering sequence of time domain first and then frequency domain. The numbers {12, 13, 14, 15, 16, 17} of the REGs in the second REG set and the numbers {24, 25, 26, 27, 28, 29} of the REGs in the third REG set are non-consecutive. The numbers {12, 13, 14, 15, 16, 17} of the REGs in the second REG set and the numbers {0, 1, 2, 3, 4, 5} of the REGs in the first REG set are also non-consecutive. The numbers of the REGs in the second subset have same features as the numbers of the REGs in the first subset. Details are not described herein again.

FIG. 6F shows another possible example of the first CORESET. The first CORESET includes six symbols in time domain and six RBs in frequency domain. Alternatively, it may be understood that the first CORESET includes 6×6=36 REGs, and a number of each REG is shown in FIG. 6F. The first CORESET includes P=2 subsets, a first subset includes 12 REGs on a first symbol and a second symbol, and a second subset includes 24 REGs on a third symbol to a sixth symbol. The first subset and the second subset respectively include two REG sets and four REG sets, as shown in bold black frames in FIG. 6F. The first subset and the second subset shown in FIG. 6F include different quantities of symbols in time domain; in other words, the first subset and the second subset respectively include two symbols and four symbols in time domain.

For example, either of the two REG sets included in the first subset includes K=6 REGs with consecutive numbers, the numbers of the K=6 REGs meet a sequence of time domain first and then frequency domain, and numbers of REGs in two adjacent REG sets are non-consecutive in frequency domain.

Any one of the four REG sets included in the second subset includes K=6 REGs with consecutive numbers, the numbers of the K=6 REGs meet the sequence of time domain first and then frequency domain, and numbers of REGs in at least two adjacent REG sets are non-consecutive in frequency domain, for example, numbers of REGs in a first REG set and a second REG set in the second subset shown in FIG. 6F are non-consecutive. Some REGs in the first REG set and the second REG set in the second subset overlap in frequency domain and do not overlap in time domain, or overlap in time domain and do not overlap in frequency domain.

Figure 6G:
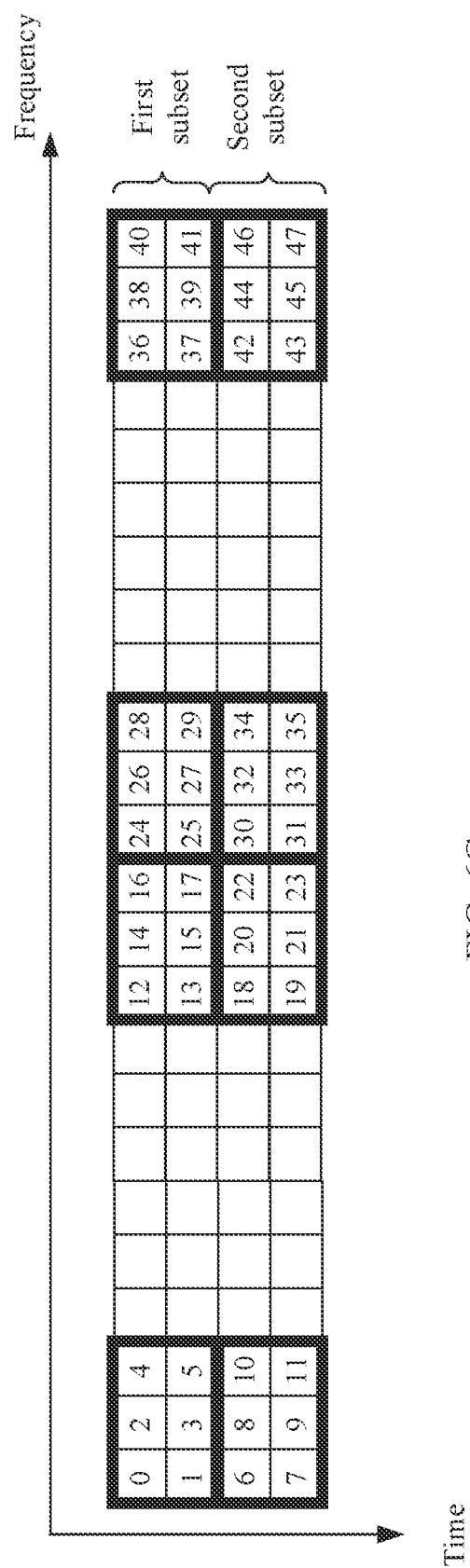

FIG. 6G is used as an example below to describe a case in which two adjacent REG sets in a subset in the first CORESET are dispersedly distributed in frequency domain.

FIG. 6G shows another possible example of the first CORESET. The first CORESET includes four symbols in time domain and 12 RBs in frequency domain. Alternatively, it may be understood that the first CORESET includes 4×12=48 REGs, and a number of each REG is shown in FIG. 6G. The first CORESET includes P=2 subsets, a first subset includes 24 REGs on a first symbol and a second symbol, and a second subset includes 24 REGs on a third symbol and a fourth symbol. The first subset and the second subset each include four REG sets, as shown in bold black frames in FIG. 6G.

In the four REG sets in the first subset shown in FIG. 6G, a first REG set (including REGs numbered 0 to 5) is adjacent to a second REG set (including REGs numbered 12 to 17), and the first REG set and the second REG set are dispersedly distributed in frequency domain (which may also be understood as that the first REG set and the second REG set are non-consecutive in frequency domain). The second REG set is adjacent to a third REG set (including REGs numbered 24 to 29), and the second REG set and the third REG set are consecutively distributed in frequency domain (which may also be understood as that the second REG set and the third REG set are consecutive in frequency domain). The third REG set is adjacent to a fourth REG set (including REGs numbered 36 to 41), and the third REG set and the fourth REG set are dispersedly distributed in frequency domain (which may also be understood as that the third REG set and the fourth REG set are non-consecutive in frequency domain). A REG set in the second subset shown in FIG. 6G has a same feature as the REG set in the first subset. Details are not described herein again.

FIG. 6A to FIG. 6G show numbers of REGs in the first CORESET by using an example in which the first CORESET includes two subsets. However, a quantity of subsets included in the first CORESET is not limited. When the first CORESET includes another quantity of subsets, the method shown in FIG. 5 is also applicable.

In the method described in FIG. 5, optionally, all the P subsets included in the first control resource set include a same quantity of symbols in time domain, or it may be understood that a quantity P of subsets included in the first control resource set and a quantity S of symbols included in the first control resource set in time domain meet S mod P=0, where S mod P indicates S modulo P. For example, all the P subsets shown in FIG. 6A, FIG. 6B, FIG. 6C, or FIG. 6E include a same quantity of symbols in time domain. In this manner, regularity of distribution of resource elements in the first control resource set can be maintained, so that receiving/sending performance of the control information in the first control resource set can be improved.

In the method described in FIG. 5, optionally, at least two subsets in the P subsets included in the first control resource set include different quantities of symbols in time domain, or it may be understood that a quantity S' of symbols included in time domain in at least one subset included in the first control resource set and a quantity S of symbols included in the first control resource set in time domain meet S mod S'≠0, where mod indicates a modulo operation. For example, at least two subsets in the P subsets shown in FIG. 6D or FIG. 6F include different quantities of symbols in time domain. In this manner, resource elements can be more flexibly allocated in the first control resource set, so that resource use efficiency can be improved.

In the method 500 shown in FIG. 5, optionally, the first control resource set includes a plurality of resource element bundles. Signals in the resource element bundle may be sent by using same precoding, and when the signal in the resource element bundle is received, joint channel estimation may be performed by using the same precoding, so that signal receiving quality can be improved.

In a possible implementation of the resource element bundle, any one of the plurality of resource element bundles includes J resource elements with consecutive numbers, where J is a positive integer. For example, J may be equal to 2, 6, or K, or J may be equal to another positive integer greater than 2. This is not limited in this application. A value of J may be predefined, or may be configured by using information and/or signaling (for example, configured by using higher layer signaling and/or downlink control information).

In another possible implementation of the resource element bundle, the P subsets include a first subset and a second subset (which may also be referred to as a first subset and a second subset), and a quantity of resource elements included in one resource element bundle in the first subset is different from a quantity of resource elements included in one resource element bundle in the second subset. Optionally, the quantity of resource elements included in one resource element bundle in the second subset is an integer multiple of the quantity of resource elements included in one resource element bundle in the first subset.

In a possible implementation of numbering the resource element bundles, in the first control resource set, the plurality of resource element bundles have consecutive numbers, and the numbers of the plurality of resource element bundles meet a numbering sequence of time domain first and then frequency domain. In another possible implementation of numbering the resource element bundles, in one of the P subsets, the plurality of resource element bundles have consecutive numbers. Optionally, in one of the P subsets, numbers of the plurality of resource element bundles meet the numbering sequence of time domain first and then frequency domain.

The numbers of the foregoing resource element bundles help implement precoding processing on the control information, so that receiving/sending performance of the control information is further improved.

The following uses an example in which the control resource set is a CORESET, the resource element is a REG, and the resource element bundle is a REG bundle to describe a number of the resource element bundle in detail.

In the method 500 shown in FIG. 5, optionally, the first CORESET includes a plurality of REG bundles, and any one of the plurality of REG bundles includes J REGs with consecutive numbers, where J is a positive integer, for example, J may be equal to 2, 4, 6, 8, or K. In a possible implementation of numbering the REG bundles, the plurality of REG bundles have consecutive numbers, and the numbers of the plurality of REG bundles meet a numbering sequence of time domain first and then frequency domain.

Figure 7A:
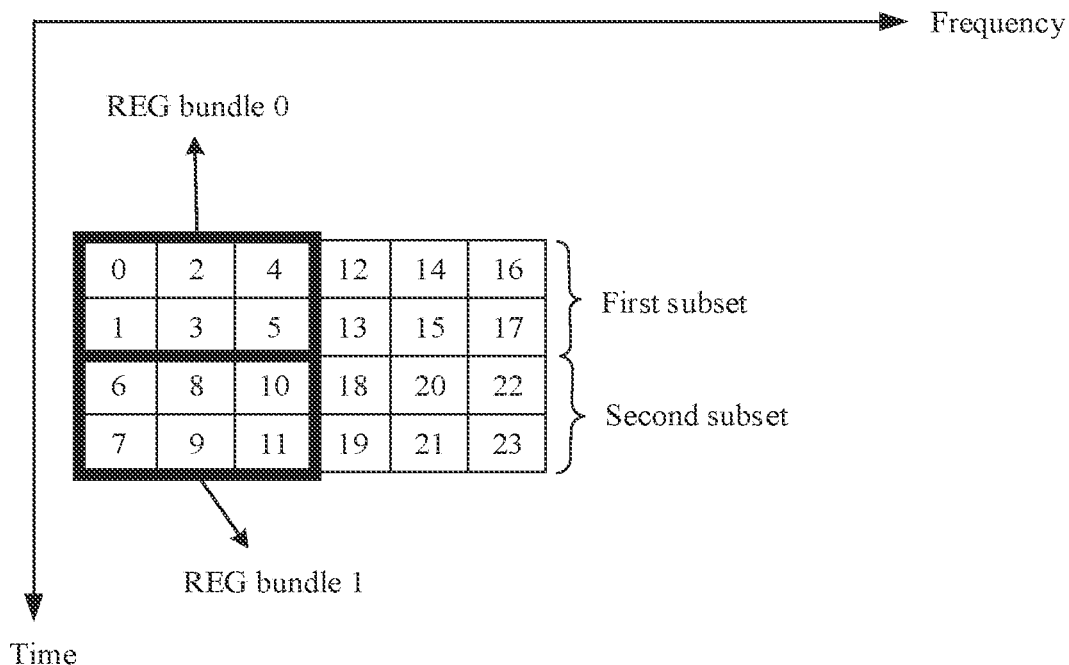
FIG. 7A to FIG. 7D are schematic diagrams of some possible numbers of resource element bundles in a first control resource set.
Figure 7B:
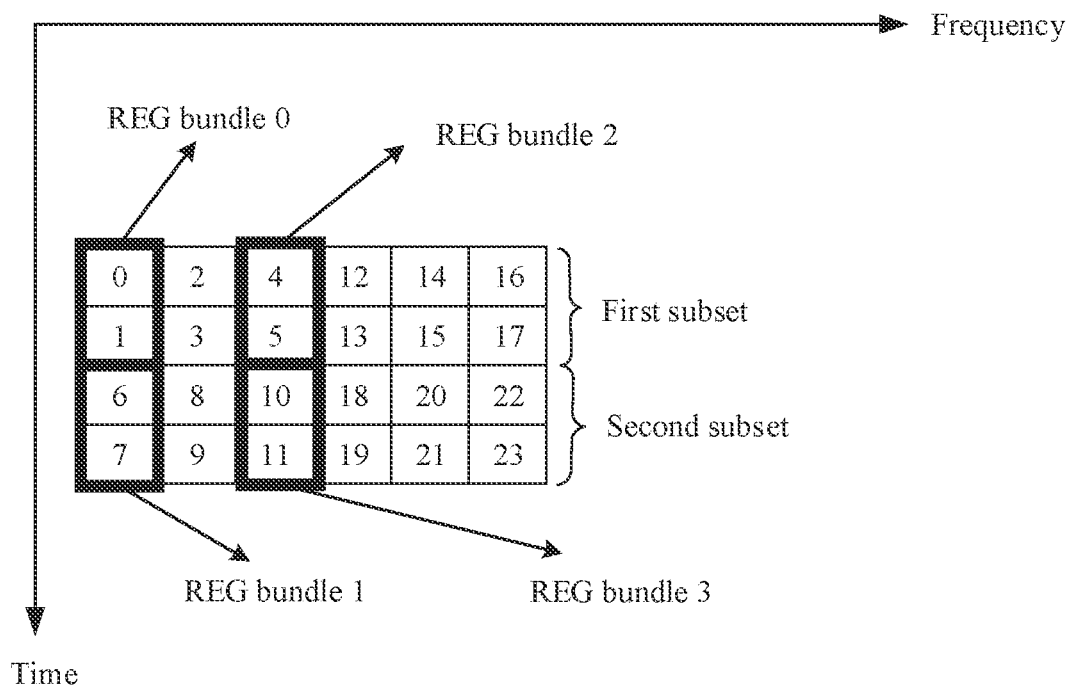

FIG. 7A and FIG. 7B are used as examples to describe a number of the REG bundle in the first CORESET.

FIG. 7A shows another possible example of the first CORESET. The first CORESET includes four symbols in time domain and six RBs in frequency domain. Alternatively, it may be understood that the first CORESET includes 4×6=24 REGs, and a number of each REG is shown in FIG. 7A. The first CORESET includes P=2 subsets, a first subset includes 12 REGs on a first symbol and a second symbol, and a second subset includes 12 REGs on a third symbol and a fourth symbol. The first CORESET includes two REG bundles: a REG bundle 0 and a REG bundle 1, as shown in bold black frames in FIG. 7A. Each REG bundle includes J=6 REGs with consecutive numbers. The two REG bundles have consecutive numbers (0 and 1 respectively), and the numbers of the two REG bundles meet a numbering sequence of time domain first and then frequency domain.

FIG. 7B shows another possible example of the first CORESET. The first CORESET includes four symbols in time domain and six RBs in frequency domain. Alternatively, it may be understood that the first CORESET includes 4×6=24 REGs, and a number of each REG is shown in FIG. 7B. The first CORESET includes P=2 subsets, a first subset includes 12 REGs on a first symbol and a second symbol, and a second subset includes 12 REGs on a third symbol and a fourth symbol. The first CORESET includes four REG bundles: a REG bundle 0, a REG bundle 1, a REG bundle 2, and a REG bundle 3, as shown in bold black frames in FIG. 7B. Each REG bundle includes J=2 REGs with consecutive numbers. The four REG bundles have consecutive numbers (0, 1, 2, and 3 respectively), and the numbers of the four REG bundles meet a numbering sequence of time domain first and then frequency domain. It may be understood that the REG bundle 2 may alternatively include other REGs. For example, the REG bundle 2 may include REGs numbered 2 and 3 instead of REGs numbered 4 and 5. The REG bundle 3 may alternatively include other REGs. For example, the REG bundle 3 may alternatively include REGs numbered 8 and 9 instead of REGs numbered 10 and 11.

In the method 500 shown in FIG. 5, optionally, the P subsets in the first CORESET include at least two subsets: a first subset and a second subset. The first subset includes one or more first REG bundles, and the second subset includes one or more second REG bundles. One first REG bundle includes J1 REGs with consecutive numbers, and one second REG bundle includes J2 REGs with consecutive numbers, where both J1 and J2 are positive integers (for example, 2, 3, 4, 5, 6, 7, 8, or K), and J1 is not equal to J2.

In a possible implementation of numbering the first REG bundle and the second REG bundle, in the first CORESET, the first REG bundle and the second REG bundle have consecutive numbers, and the numbers of the first REG bundle and the second REG bundle meet a numbering sequence of time domain first and then frequency domain.

In another possible implementation of numbering the first REG bundle and the second REG bundle, one or more first REG bundles in the first subset have consecutive numbers, and one or more second REG bundles in the second subset have consecutive numbers. Optionally, the numbers of the one or more first REG bundles in the first subset meet a numbering sequence of time domain first and then frequency domain, and the numbers of the one or more second REG bundles in the second subset meet the numbering sequence of time domain first and then frequency domain.

Figure 7C:
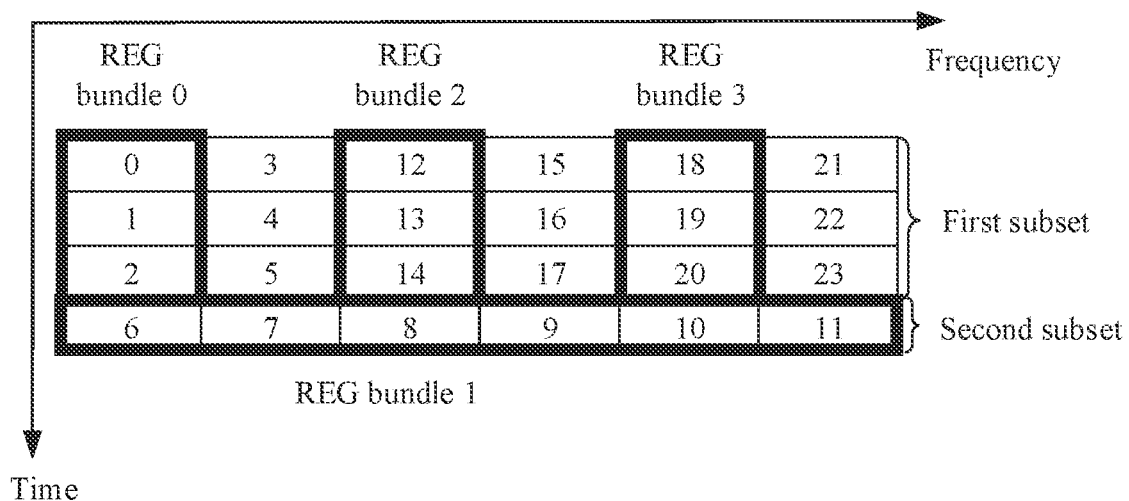
Figure 7D:
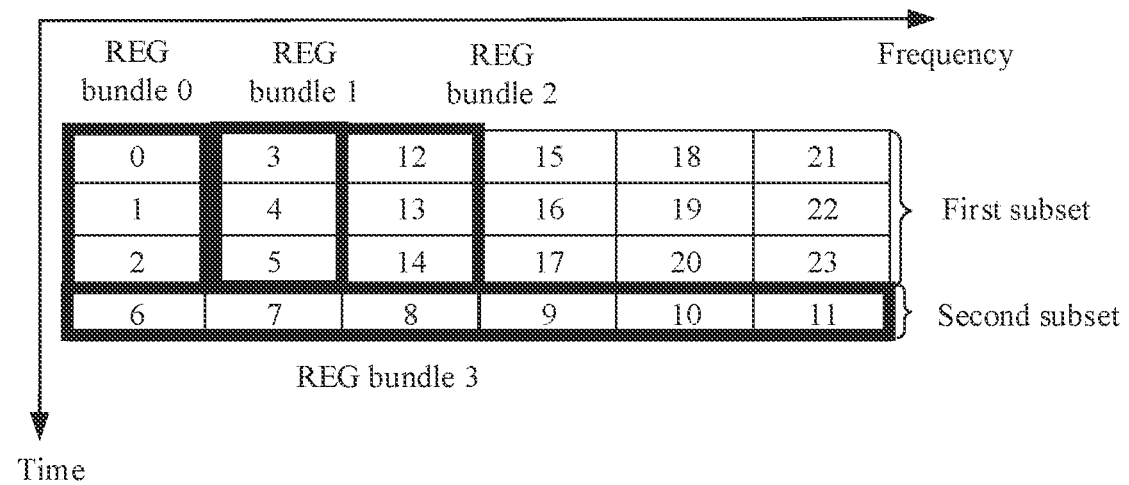

FIG. 7C and FIG. 7D are used as examples to describe a number of the REG bundle in the first CORESET.

FIG. 7C shows another possible example of the first CORESET. The first CORESET includes four symbols in time domain and six RBs in frequency domain. Alternatively, it may be understood that the first CORESET includes 4×6=24 REGs, and a number of each REG is shown in FIG. 7C. The first CORESET includes P=2 subsets, a first subset (which may also be referred to as a first subset) includes 18 REGs on a first symbol, a second symbol, and a third symbol, and a second subset (which may also be referred to as a second subset) includes six REGs on a fourth symbol. The first CORESET includes four REG bundles: a REG bundle 0, a REG bundle 1, a REG bundle 2, and a REG bundle 3, as shown in bold black frames in FIG. 7C. The first subset includes three first REG bundles: a first REG bundle 0, the REG bundle 2, and the REG bundle 3. The second subset includes one second REG bundle: the REG bundle 1. Any first REG bundle includes J1=3 REGs with consecutive numbers, and any second REG bundle includes J2=6 REGs with consecutive numbers. The REG bundle 0, the REG bundle 1, the REG bundle 2, and the REG bundle 3 have consecutive numbers (0, 1, 2, and 3 respectively) in the first CORESET, and the numbers of the four REG bundles meet a numbering sequence of time domain first and then frequency domain in the first CORESET. Some of REGs included in some REG bundles with consecutive numbers in the CORESET overlap in frequency domain, and some do not overlap. Some REG bundles with consecutive numbers are non-consecutive in frequency domain.

FIG. 7D shows another possible example of the first CORESET. The first CORESET includes four symbols in time domain and six RBs in frequency domain. Alternatively, it may be understood that the first CORESET includes 4–6=24 REGs, and a number of each REG is shown in FIG. 7D. The first CORESET includes P=2 subsets, a first subset (which may also be referred to as a first subset) includes 18 REGs on a first symbol, a second symbol, and a third symbol, and a second subset (which may also be referred to as a second subset) includes six REGs on a fourth symbol. The first CORESET includes four REG bundles: a REG bundle 0, a REG bundle 1, a REG bundle 2, and a REG bundle 3, as shown in bold black frames in FIG. 7D. The first subset includes three first REG bundles: a first REG bundle 0, the REG bundle 1, and the REG bundle 2. The second subset includes one second REG bundle: the REG bundle 3. Any first REG bundle includes J1=3 REGs with consecutive numbers, and any second REG bundle includes J2=6 REGs with consecutive numbers. The REG bundle 0, the REG bundle 1, and the REG bundle 2 have consecutive numbers in the first subset, and the REG bundle 3 has consecutive numbers in the second subset.

The part 510 and the part 520 in FIG. 5 may alternatively be replaced with other implementations.

In another possible implementation of the part 510 and the part 520, the part 510 and the part 520 may be respectively replaced with the following operation 1 and operation 2.

Operation 1: A terminal determines a first control resource set, where the first control resource set includes P subsets, the first control resource set includes a plurality of resource elements, and P is an integer greater than 1. The plurality of resource elements included in the first control resource set are numbered based on the following step 5-1 and step 5-2.

Operation 2: A network device determines a first control resource set, where the first control resource set includes P subsets, the first control resource set includes a plurality of resource elements, and P is an integer greater than 1. The plurality of resource elements included in the first control resource set are numbered based on the following step 5-1 and step 5-2.

Step 5-1: Sequentially number, in a sequence of time domain first and then frequency domain, K resource elements that are not numbered in each of the P subsets, until the P subsets are traversed, where K is a positive integer.

Step 5-2: Repeat step 5-1 until all resource elements included in the first control resource set are numbered.

It may be understood that "sequentially" in step 5-1 may be understood as follows: For the P subsets, the K resource elements that are not numbered in each subset are numbered in a sequence of a first subset, a second subset, . . . , and a $P^{th}$ subset. For example, after K resource elements that are not numbered in the first subset are numbered in the sequence of time domain first and then frequency domain, K resource elements that are not numbered in the second subset are numbered, . . . , and step 5-2 is not performed until K resource elements that are not numbered in the $P^{th}$ subset are numbered in the sequence of time domain first and then frequency domain.

The foregoing step 5-1 and step 5-2 may also be understood as the following step 5-1', step 5-2', and step 5-3'.

Step 5-1': In a first subset in the P subsets, number, in a sequence of time domain first and then frequency domain, resource elements that are not numbered, and process a second subset when a quantity of resource elements that are numbered reaches K.

Step 5-2'. In a $p^{th}$ subset in the P subsets (p is an integer greater than 1), number, in the sequence of time domain first and then frequency domain, resource elements that are not numbered, and when a quantity of resource elements that are numbered reaches K, process a $(p+1)^{th}$ subset and continue to perform step 5-2' to number resource elements that are not numbered in the $(p+1)^{th}$ subset until resource elements that are not numbered in a $P^{th}$ subset are numbered based on step 5-2'.

Step 5-3': Repeat step 5-1' and step 5-2' until all resource elements included in the first control resource set are numbered.

It may be understood that, in this application, optionally, all in the P subsets may be sequentially arranged into the first subset, the second subset, . . . , and the $P^{th}$ subset in a sequence of time corresponding to the P subsets.

In another possible implementation of the part 510 and the part 520, the part 510 and the part 520 may be respectively replaced with the following operation 3 and operation 4.

Operation 3: A terminal determines a first control resource set, where the first control resource set includes P subsets, the first control resource set includes a plurality of resource elements, and P is an integer greater than 1. Numbers of resource elements in the P subsets meet the following numbering manner 5-1" or numbering manner 5-2".

Operation 4: A network device determines a first control resource set, where the first control resource set includes P subsets, the first control resource set includes a plurality of resource elements, and P is an integer greater than 1. Numbers of resource elements in the P subsets meet the following numbering manner 5-1" or numbering manner 5-2".

Numbering manner 5-1": When all the P subsets include a same quantity of resource elements, resource elements included in a subset p in the P subsets are numbered in the subset p in a sequence of time domain first and then frequency domain, and numbers of the resource elements included in the subset p meet $\{p \times K + i + n \times P \times K\}$, where p=0, 1, . . . , P−1, i=0, 1, . . . , K−1, K is a positive integer (K may also be understood as a minimum quantity of resource elements required for carrying control information or a quantity of resource elements required for carrying control information), n=0, 1, . . . , N−1, N=floor(Q/K/P), Q is a quantity of resource elements included in the first control resource set, and floor(X) indicates rounding down X. A first subset, a second subset, . . . , and a $P^{th}$ subset in the P subsets may respectively correspond to a subset 0, a subset 1, . . . , and a subset P−1.

Numbering manner 5-2": When at least two subsets in the P subsets include different quantities of resource elements, resource elements included in a subset p in the P subsets are numbered in the subset p in a sequence of time domain first and then frequency domain, and numbers of the resource elements included in the subset p meet $\{N_{start,k} + n_k \times (P-y(k)) \times K\}$, where $N_{start,k} = p \times K + i + M_{k-1} \times (P-k+1) \times K$, p=0, 1, . . . , P−1, i=0, 1, . . . , K−1, K is a positive integer (K may also be understood as a minimum quantity of resource elements required for carrying control information or a quantity of resource elements required for carrying control information), $n_k$=0, 1, . . . , $M_k - M_{k-1} - 1$, $M_{-1}$=0, k=0, 1, . . . , $index_p$, $index_p$=f(p), 0≤$index_p$≤U−1, f(p) represents an index corresponding to $N_p$ in a set $\{M_0, M_1, \ldots, M_{U-1}\}$, the set $\{M_0, M_1, \ldots, M_{U-1}\}$ is a subset of a set $\{N_0, N_1, \ldots, N_{P-1}\}$, $M_0 < M_1 < \ldots < M_{U-1}$, and for any $N_p$, $g(N_p) = M_{f(p)}$, where $N_p$=floor($Q_p$/I), $Q_p$ is a quantity of resource elements included in the subset p, y(k) represents a quantity of $N_p$ that is in the set $\{M_0, M_1, \ldots, M_{U-1}\}$ and whose index is less than or equal to k−1, and y(0)=0.

In another possible implementation of the part 510 and the part 520, the part 510 and the part 520 may be respectively replaced with the following operation 5 and operation 6.

Operation 5: A terminal determines a first control resource set, where a quantity of symbols included in the first control resource set in time domain is a positive integer less than or equal to M, and M is a positive integer (for example, M is an integer greater than 3, or M is a positive integer less than or equal to 3). The first control resource set includes P subsets, and P is an integer greater than 1. Numbers of a plurality of resource elements included in the first control resource set meet: One subset in the P subsets includes a plurality of resource element sets, and one resource element set in the plurality of resource element sets includes K resource elements, where K is a positive integer, the K resource elements have consecutive numbers, the numbers of the K resource elements meet a sequence of time domain first and then frequency domain, and numbers of resource elements in any two adjacent resource element sets in the plurality of resource element sets are non-consecutive, or numbers of resource elements in at least two adjacent resource element sets in the plurality of resource element sets are non-consecutive.

Operation 6: A network device determines a first control resource set, where a quantity of symbols included in the first control resource set in time domain is a positive integer less than or equal to M, and M is a positive integer (for example, M is an integer greater than 3, or M is a positive integer less than or equal to 3). The first control resource set includes P subsets, and P is an integer greater than 1. Numbers of a plurality of resource elements included in the first control resource set meet. One subset in the P subsets includes a plurality of resource element sets, and one resource element set in the plurality of resource element sets includes K resource elements, where K is a positive integer, the K resource elements have consecutive numbers, the numbers of the K resource elements meet a sequence of time domain first and then frequency domain, and numbers of resource elements in any two adjacent resource element sets in the plurality of resource element sets are non-consecutive, or numbers of resource elements in at least two adjacent resource element sets in the plurality of resource element sets are non-consecutive.

The implementation including the foregoing parts 510, 520, and 530 may also be understood as another possible implementation in which the method described in FIG. 5 is combined with the method described in FIG. 3. For other specific content of this implementation, refer to the foregoing descriptions of corresponding content in FIG. 3 and FIG. 5. Details are not described herein again.

Figure 8:
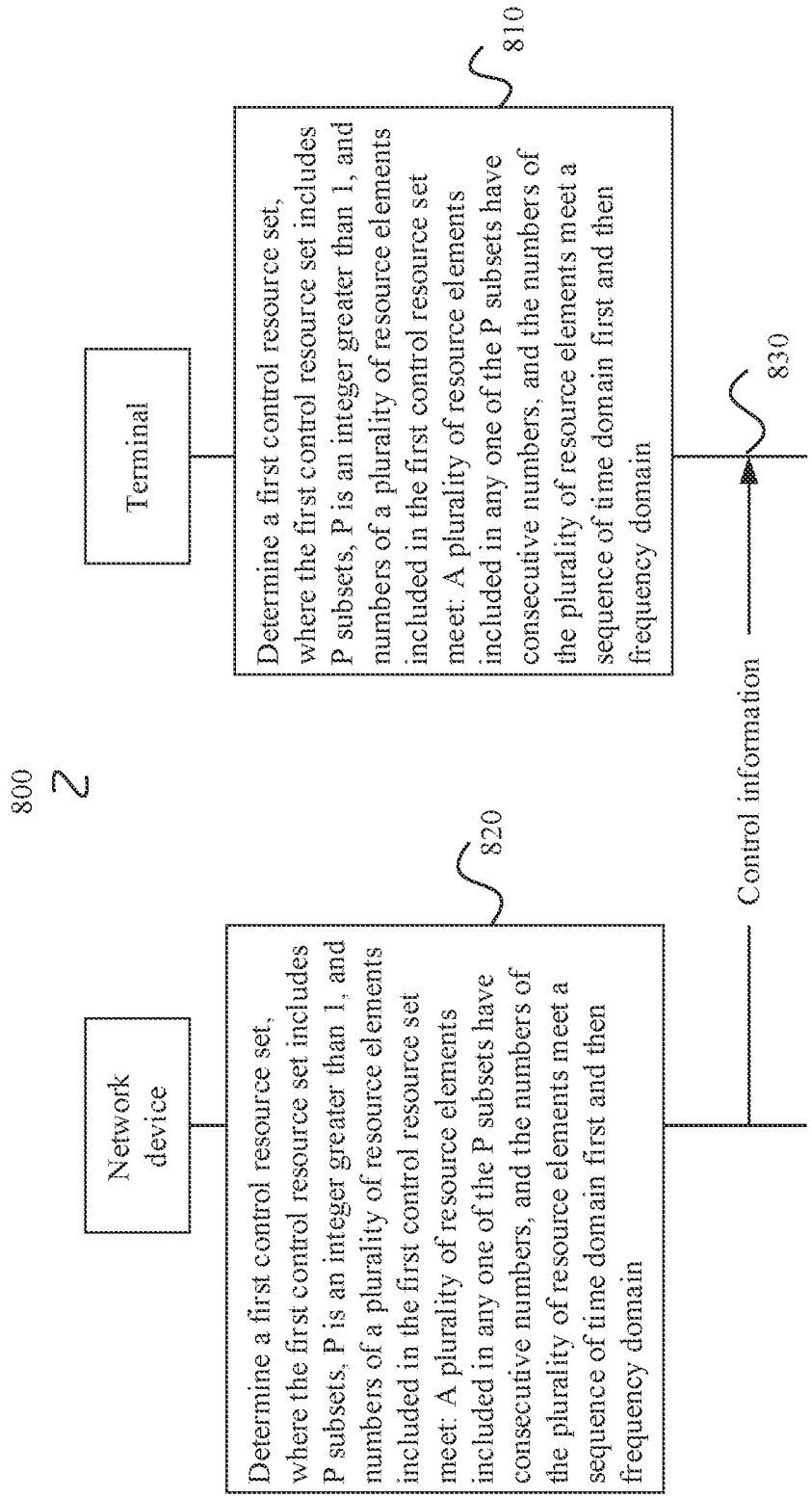
FIG. 8 is a schematic interaction diagram of another communication method according to an embodiment of this application.

FIG. 8 is a schematic interaction diagram of a communication method 800 according to an embodiment of this application. In FIG. 8, for example, a terminal and a network device are used as entities for executing the schematic interaction diagram, to show the communication method. However, this application does not limit the entities for executing the schematic interaction diagram. For example, the entities for executing the schematic interaction diagram may alternatively be one terminal and another terminal. For another example, the network device in FIG. 8 may alternatively be a chip, a chip system, or a processor that supports the network device in implementing the method, and the terminal in FIG. 8 may alternatively be a chip, a chip system, or a processor that supports the terminal in implementing the method. It may be understood that the embodiment described in FIG. 8 may be implemented as a separate implementation, and may alternatively be combined with another embodiment and/or implementation of this application without a conflict, to generate a new embodiment and/or implementation.

As shown in FIG. 8, a method 800 in this embodiment may include the following parts.

Part 810: A terminal determines a first control resource set, where the first control resource set includes P subsets, and P is an integer greater than 1. Numbers of a plurality of resource elements included in the first control resource set meet: A plurality of resource elements included in any one of the P subsets have consecutive numbers, and the numbers of the plurality of resource elements meet a sequence of time domain first and then frequency domain.

Part 820: A network device determines a first control resource set, where the first control resource set includes P subsets, and P is an integer greater than 1. Numbers of a plurality of resource elements included in the first control resource set meet: A plurality of resource elements included in any one of the P subsets have consecutive numbers, and the numbers of the plurality of resource elements meet a sequence of time domain first and then frequency domain.

An execution sequence of the part 810 and the part 820 is not limited in this application. For example, the part 810 may be executed before the part 820. For another example, the part 820 may be executed before the part 810. For another example, the part 810 and the part 820 may be executed simultaneously.

Part 830: The network device sends control information on one or more resource elements in the first control resource set, and the terminal receives the control information on one or more resource elements in the first control resource set. Optionally, the network device sends the control information on the one or more resource elements in the first control resource set based on the number described in the part 820, and the terminal receives the control information on the one or more resource elements in the first control resource set based on the number described in the part 810.

In the method 800 described in FIG. 8, resource elements in the first control resource set are numbered in a plurality of subsets in a centralized manner, to reduce dispersed resource elements and ensure effective utilization of the resource element.

In the following descriptions, for example, the control resource set is a CORESET, and the resource element is a REG, to describe the method shown in FIG. 8 in detail.

In the part 810 and the part 820, the first CORESET includes P subsets, and the first CORESET includes a plurality of REGs, where P is an integer greater than 1. Numbers of a plurality of REGs included in the first CORESET meet: A plurality of REGs included in any one of the P subsets have consecutive numbers, and the numbers of the plurality of REGs meet a sequence of time domain first and then frequency domain. Optionally, REGs separately included in the P subsets do not overlap each other. Optionally, all the P subsets include a same quantity of symbols in time domain, or at least two subsets in the P subsets include different quantities of symbols in time domain.

In a possible implementation of the P subsets in the method 800, all the P subsets include a same quantity of symbols in time domain.

Figure 9A:
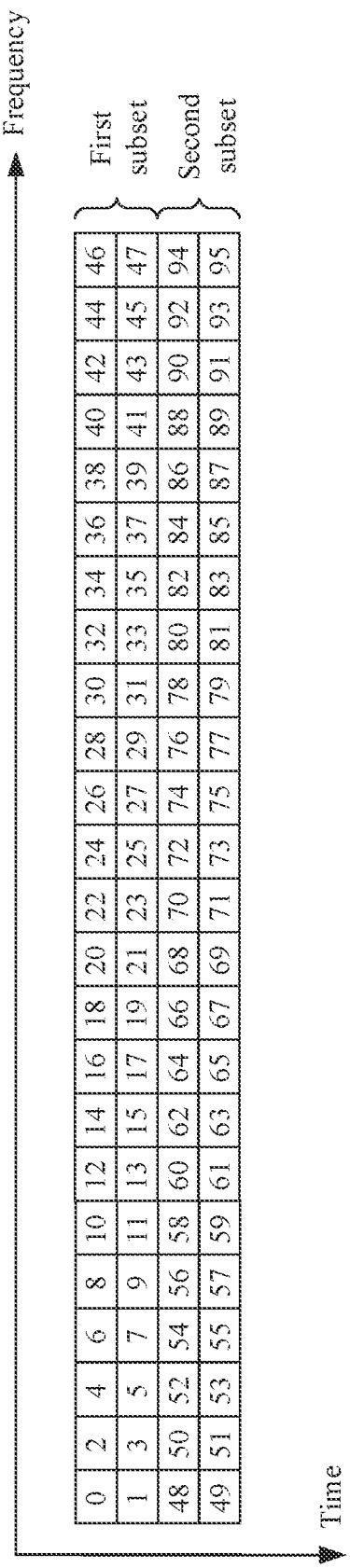
FIG. 9A and FIG. 9B are schematic diagrams of some other possible numbers of resource elements in a first control resource set.

FIG. 9A is used as an example to describe a number of a REG in the first CORESET. FIG. 9A shows a possible example of the first CORESET. The first CORESET includes four symbols in time domain and 24 RBs in frequency domain. Alternatively, it may be understood that the first CORESET includes 4×24=96 REGs, and a number of each REG is shown in FIG. 9A. The first CORESET includes P=2 subsets, a first subset includes 48 REGs on a first symbol and a second symbol, and a second subset includes 48 REGs on a third symbol and a fourth symbol. The first subset and the second subset shown in FIG. 9A include a same quantity of symbols in time domain; in other words, the first subset and the second subset each include two symbols in time domain. The 48 REGs included in the first subset have consecutive numbers (0 to 47), and meet a numbering sequence of time domain first and then frequency domain. The 48 REGs included in the second subset have consecutive numbers (48 to 95), and also meet the numbering sequence of time domain first and then frequency domain.

In another possible implementation of the P subsets in the method 800, at least two subsets in the P subsets include different quantities of symbols in time domain.

Figure 9B:
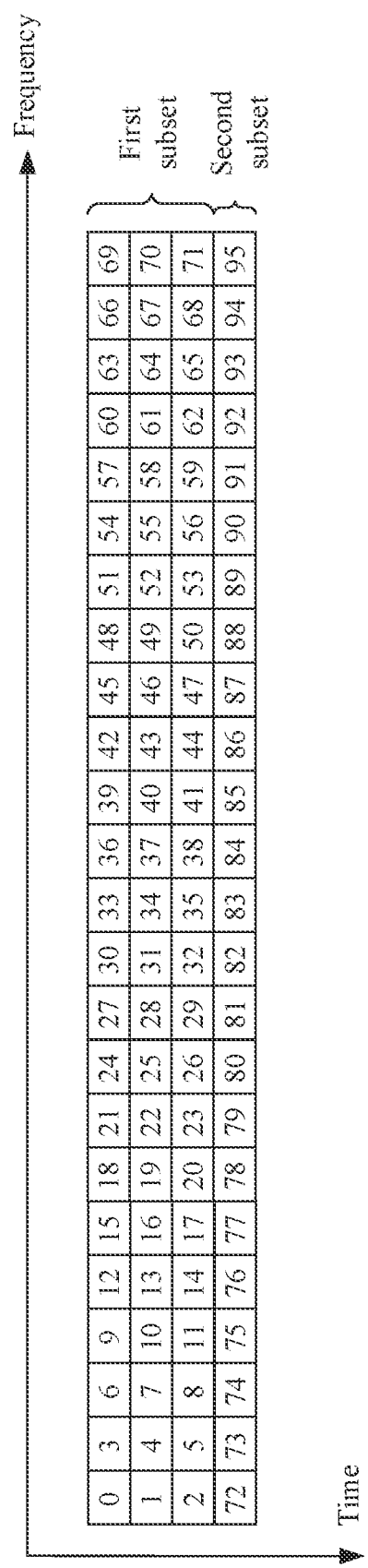

FIG. 9B is used as an example to describe a number of a REG in the first CORESET. FIG. 9B shows another possible example of the first CORESET. The first CORESET includes four symbols in time domain and 24 RBs in frequency domain. Alternatively, it may be understood that the first CORESET includes 4×24=96 REGs, and a number of each REG is shown in FIG. 9A. The first CORESET includes P=2 subsets, a first subset includes 72 REGs on a first symbol, a second symbol, and a third symbol, and a second subset includes 24 REGs on a fourth symbol. The first subset and the second subset shown in FIG. 9B include different quantities of symbols in time domain; in other words, the first subset and the second subset respectively include three symbols and one symbol in time domain. The 72 REGs included in the first subset have consecutive numbers (0 to 71), and meet a numbering sequence of time domain first and then frequency domain. The 24 REGs included in the second subset have consecutive numbers (72 to 95), and also meet the numbering sequence of time domain first and then frequency domain.

Both FIG. 9A and FIG. 9B show numbers of REGs in the first CORESET by using an example in which the first CORESET includes four symbols in time domain. However, a quantity of symbols included in the first CORESET in time domain is not limited. When the first CORESET includes another quantity of symbols in time domain, the method shown in FIG. 8 is also applicable. Both FIG. 9A and FIG. 9B show numbers of REGs in the first CORESET by using an example in which the first CORESET includes two subsets. However, a quantity of subsets included in the first CORESET is not limited. When the first CORESET includes another quantity of subsets, the method shown in FIG. 8 is also applicable.

In the method 800, optionally, a quantity of symbols included in one of the P subsets in time domain is one of a quantity of one or more candidate symbols in another control resource set in time domain, or a quantity of symbols included in one of the P subsets in time domain is a maximum value of a quantity of one or more candidate symbols in another control resource set in time domain. In this implementation, when the first control resource set and the another control resource set coexist, dispersedly distributed resource elements can be reduced or eliminated as much as possible, so that resource use efficiency is improved.

In the method 800 shown in FIG. 8, optionally, the first control resource set includes a plurality of resource element bundles, and any one of the plurality of resource element bundles includes J resource elements with consecutive numbers, where J is a positive integer. For example, J may be equal to 2, 6, or K, or J may be equal to another positive integer greater than 2. This is not limited in this application. A value of J may be predefined, or may be configured by using information and/or signaling (for example, configured by using higher layer signaling and/or downlink control information). In a possible implementation of numbering the resource element bundles, the plurality of resource element bundles have consecutive numbers, and the numbers of the plurality of resource element bundles meet a numbering sequence of time domain first and then frequency domain.

The numbers of the foregoing resource element bundles help implement precoding processing on the control information, so that receiving/sending performance of the control information is further improved. For more detailed descriptions of the numbers of the resource element bundles, refer to the descriptions of the numbers of the resource element bundles in the method shown in FIG. 5. Details are not described herein again.

The part 810 and the part 820 in FIG. 8 may alternatively be replaced with other implementations.

In another possible implementation of the part 810 and the part 820, the part 810 and the part 820 may be respectively replaced with the following operation 7 and operation 8.

Operation 7: A terminal determines a first control resource set, where the first control resource set includes P subsets, the first control resource set includes a plurality of resource elements, and P is an integer greater than 1. The plurality of resource elements included in the first control resource set are numbered based on the following step 8-1.

Operation 8: The network device determines a first control resource set, where the first control resource set includes P subsets, the first control resource set includes a plurality of resource elements, and P is an integer greater than 1. The plurality of resource elements included in the first control resource set are numbered based on the following step 8-1.

Step 8-1: Sequentially number all resource elements in each of the P subsets in a sequence of time domain first and then frequency domain until the P subsets are traversed.

The foregoing step 8-1 may also be understood as the following step 8-1' and step 8-2'.

Step 8-1': In a first subset in the P subsets, number all resource elements in the first subset in a sequence of time domain first and then frequency domain.

Step 8-2': In a $p^{th}$ subset in the P subsets (p is an integer greater than 1), number, in the sequence of time domain first and then frequency domain, all resource elements included in the $p^{th}$ subset, and continue to perform step 8-2' to number all resource elements in a $(p+1)^{th}$ subset until all resource elements in a $P^{th}$ subset are numbered based on step 8-2'.

In another possible implementation of the part 810 and the part 820, the part 810 and the part 820 may be respectively replaced with the following operation 9 and operation 10.

Operation 9: A terminal determines a first control resource set, where the first control resource set includes P subsets, the first control resource set includes a plurality of resource elements, and P is an integer greater than 1. Numbers of resource elements in the P subsets meet the following numbering manner 8-1".

Operation 10: A network device determines a first control resource set, where the first control resource set includes P subsets, the first control resource set includes a plurality of resource elements, and P is an integer greater than 1. Numbers of resource elements in the P subsets meet the following numbering manner 8-1".

Numbering manner 8-1": Resource elements included in a subset p in the P subsets are numbered in the subset p in a sequence of time domain first and then frequency domain, and numbers of the resource elements included in the subset p in the P subsets are $Index_{start,p}+i_p$, where $i_p=0, 1, \ldots, Q_i-1$, $Q_i$ is a quantity of resource elements included in a subset i, and $i=0, 1, \ldots, P-1$. When p is greater than 0, $Index_{start,p}=\Sigma_{i=0}^{p-1}Q_i$. When p is equal to 0, $Index_{start,p}=0$. A subset 0 may correspond to a first subset, a subset 1 may correspond to a second subset, . . . , and a subset P−1 may correspond to a $P^{th}$ subset. It may be understood that numbers of the foregoing subsets are merely a possible example and are used to represent a sequence of the subsets. Another manner of numbering the subsets is not limited in this application.

In another possible implementation of the part 810 and the part 820, the part 810 and the part 820 may be respectively replaced with the following operation 11 and operation 12.

Operation 11: A terminal determines a first control resource set, where a quantity of symbols included in the first control resource set in time domain is a positive integer less than or equal to M, and M is a positive integer (for example, M is an integer greater than 3, or M is a positive integer less than or equal to 3). The first control resource set includes P subsets, and P is an integer greater than 1. Numbers of a plurality of resource elements included in the first control resource set meet: A plurality of resource elements included in any one of the P subsets have consecutive numbers, and the numbers of the plurality of resource elements meet a sequence of time domain first and then frequency domain.

Operation 12: A network device determines a first control resource set, where a quantity of symbols included in the first control resource set in time domain is a positive integer less than or equal to M, and M is a positive integer (for example, M is an integer greater than 3, or M is a positive integer less than or equal to 3). The first control resource set includes P subsets, and P is an integer greater than 1. Numbers of a plurality of resource elements included in the first control resource set meet: A plurality of resource elements included in any one of the P subsets have consecutive numbers, and the numbers of the plurality of resource elements meet a sequence of time domain first and then frequency domain.

The implementation including the foregoing parts 810, 820, and 830 may also be understood as another possible implementation in which the method described in FIG. 8 is combined with the method described in FIG. 3. For other specific content of this implementation, refer to the foregoing descriptions of corresponding content in FIG. 3 and FIG. 8. Details are not described herein again.

Figure 10:
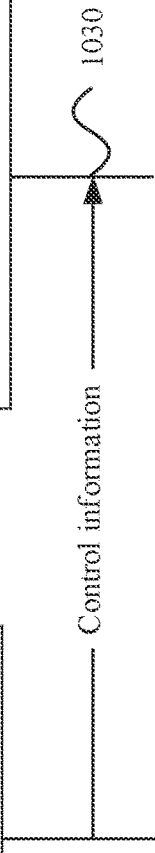
FIG. 10 is a schematic interaction diagram of another communication method according to an embodiment of this application.

FIG. 10 is a schematic interaction diagram of a communication method 1000 according to an embodiment of this application. In FIG. 10, for example, a terminal and a network device are used as entities for executing the schematic interaction diagram, to show the communication method. However, this application does not limit the entities for executing the schematic interaction diagram. For example, the entities for executing the schematic interaction diagram may alternatively be one terminal and another terminal. For another example, the network device in FIG. 10 may alternatively be a chip, a chip system, or a processor that supports the network device in implementing the method, and the terminal in FIG. 10 may alternatively be a chip, a chip system, or a processor that supports the terminal in implementing the method. It may be understood that the embodiment described in FIG. 10 may be implemented as a separate implementation, and may alternatively be combined with another embodiment and/or implementation of this application without a conflict, to generate a new embodiment and/or implementation.

As shown in FIG. 10, a method 1000 in this embodiment may include the following parts.

Part 1010: A terminal determines a first control resource set, where the first control resource set includes P subsets, and P is an integer greater than 1. Numbers of a plurality of resource elements included in the first control resource set meet: One subset in the P subsets includes a plurality of resource element sets set1, and one resource element set in the plurality of resource element sets set1 includes K resource elements, where K is a positive integer, the K resource elements have consecutive numbers, the numbers of the K resource elements meet a sequence of time domain first and then frequency domain, numbers of resource elements in a part of two adjacent resource element sets in the plurality of resource element sets set1 are non-consecutive, and numbers of resource elements in the other part of two adjacent resource element sets in the plurality of resource element sets set1 are consecutive. Optionally, another subset in the P subsets includes a plurality of resource element sets set2, and one resource element set in the plurality of resource element sets set2 includes K resource element sets, where K is a positive integer, the K resource elements have consecutive numbers, the numbers of the K resource elements meet the sequence of time domain first and then frequency domain, and numbers of resource elements in any two resource element sets in the plurality of resource element sets set2 are non-consecutive.

Part 1020: A network device determines a first control resource set, where the first control resource set includes P subsets, and P is an integer greater than 1. Numbers of a plurality of resource elements included in the first control resource set meet: One subset in the P subsets includes a plurality of resource element sets set1, and one resource element set in the plurality of resource element sets set1 includes K resource elements, where K is a positive integer, the K resource elements have consecutive numbers, the numbers of the K resource elements meet a sequence of time domain first and then frequency domain, numbers of resource elements in a part of two adjacent resource element sets in the plurality of resource element sets set1 are non-consecutive, and numbers of resource elements in the other part of two adjacent resource element sets in the plurality of resource element sets set1 are consecutive. Optionally, another subset in the P subsets includes a plurality of resource element sets set2, and one resource element set in the plurality of resource element sets set2 includes K resource element sets, where K is a positive integer, the K resource elements have consecutive numbers, the numbers of the K resource elements meet the sequence of time domain first and then frequency domain, and numbers of resource elements in any two resource element sets in the plurality of resource element sets set2 are non-consecutive.

An execution sequence of the part 1010 and the part 1020 is not limited in this application. For example, the part 1010 may be executed before the part 1020. For another example, the part 1020 may be executed before the part 1010. For another example, the part 1010 and the part 1020 may be executed simultaneously.

Part 1030: The network device sends control information on one or more resource elements in the first control resource set, and the terminal receives the control information on the one or more resource elements in the first control resource set. Optionally, the network device sends the control information on the one or more resource elements in the first control resource set based on the number described in the part 1020, and the terminal receives the control information on the one or more resource elements in the first control resource set based on the number described in the part 1010.

In the method 1000 described in FIG. 10, the resource elements in the first control resource set are alternately numbered (which may alternatively be understood as interleaved numbering) in a plurality of subsets, so that control resource utilization can be improved, discrete resources are reduced, and resource waste is reduced, and therefore receiving/sending performance of the control information can be improved.

In the following descriptions, for example, the control resource set is a CORESET, and the resource element is a REG, to describe the method shown in FIG. 10 in detail.

In the part 1010 and the part 1020, the first CORESET includes P subsets, and the first CORESET includes a plurality of REGs, where P is an integer greater than 1. Numbers of the plurality of REGs included in the first CORESET meet: One subset in the P subsets includes a plurality of REG sets, and one REG set in the plurality of REG sets include K REGs, where K is a positive integer (for example, K is 1, 2, 3, 4, 5, 6, 7, 8, 9, or 10), the K REGs have consecutive numbers, the numbers of the K REGs meet a sequence of time domain first and then frequency domain, numbers of REGs in a part of two adjacent REG sets in the plurality of REG sets are non-consecutive, and numbers of REGs in the other part of two adjacent REG sets in the plurality of REG sets are consecutive. Optionally, REGs separately included in the P subsets do not overlap each other. Optionally, at least two subsets in the P subsets include different quantities of symbols in time domain. Optionally, two adjacent REG sets in the plurality of REG sets are two REG sets that are adjacent in frequency domain. Optionally, a value of K is equal to a quantity $N_{REG}^{CCE}$ of REGs included in one CCE.

In a possible implementation of the P subsets in the method 1000, at least two subsets in the P subsets include different quantities of symbols in time domain, any one of the P subsets includes a plurality of REG sets, any one of the plurality of REG sets includes K REGs, the K REGs have consecutive numbers, the numbers of the K REGs meet a sequence of time domain first and then frequency domain, numbers of REGs in a part of two adjacent REG sets in the plurality of REG sets are non-consecutive, and numbers of resource elements in the other part of two adjacent REG sets in the plurality of REG sets are consecutive. In this implementation, at least two subsets in the P subsets include different quantities of REG sets.

Figure 11:
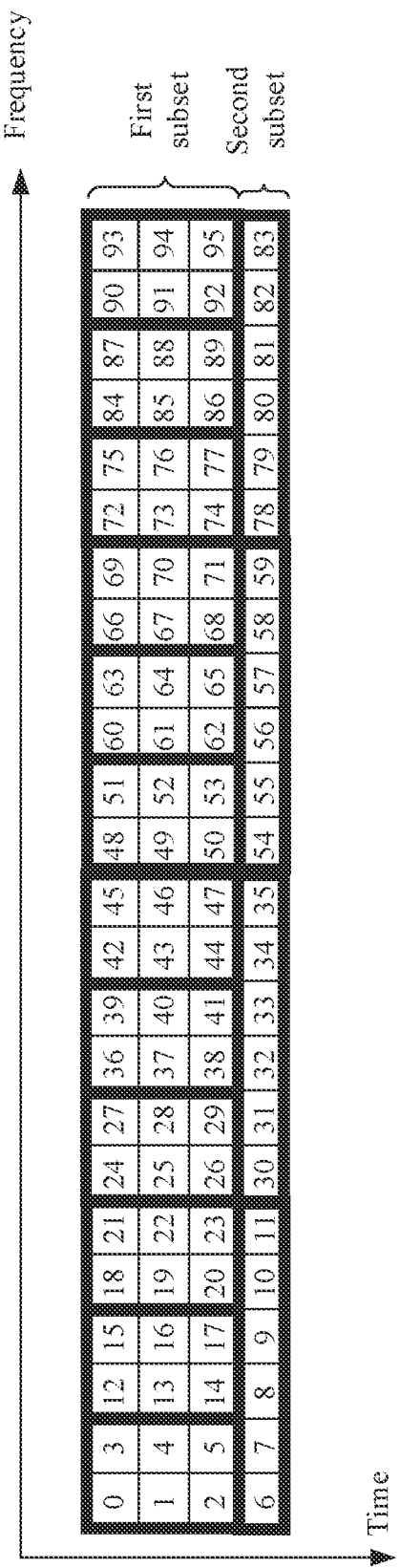
FIG. 11 is a schematic diagram of some other possible numbers of resource elements in a first control resource set.

FIG. 11 is used as an example to describe a number of a REG in the first CORESET. FIG. 11 shows a possible example of the first CORESET. The first CORESET includes four symbols in time domain and 24 RBs in frequency domain. Alternatively, it may be understood that the first CORESET includes 4×24=96 REGs, and a number of each REG is shown in FIG. 11. The first CORESET includes P=2 subsets, a first subset includes 72 REGs on a first symbol, a second symbol, and a third symbol, and a second subset includes 24 REGs on a fourth symbol. The first subset and the second subset respectively include 12 REG sets and four REG sets, as shown in bold black frames in FIG. 11. The first subset and the second subset shown in FIG. 11 include different quantities of symbols in time domain; in other words, the first subset and the second subset respectively include three symbols and one symbol in time domain.

For example, any one of the 12 REG sets included in the first subset includes K=6 REGs with consecutive numbers, and the numbers of the K=6 REGs meet a sequence of time domain first and then frequency domain. The 12 REG sets included in the first subset may be understood as the foregoing set1.

Numbers of REGs in a part of two adjacent REG sets in the set1 are non-consecutive. For example, numbers of REGs in the following two adjacent REG sets in a first subset shown in FIG. 11 are non-consecutive: a first REG set (a REG set including REGs numbered 0, 1, 2, 3, 4, and 5) and a second REG set (a REG set including REGs numbered 12, 13, 14, 15, 16, and 17), a fourth REG set (a REG set including REGs numbered 24, 25, 26, 27, 28, and 29) and a fifth REG set (a REG set including REGs numbered 36, 37, 38, 39, 40, and 41), and a seventh REG set (a REG set including REGs numbered 48, 49, 50, 51, 52, and 53) and an eighth REG set (a REG set including REGs numbered 60, 61, 62, 63, 64, and 65), and a tenth REG set (a REG set including REGs numbered 72, 73, 74, 75, 76, and 77) and an eleventh REG set (a REG set including REGs numbered 84, 85, 86, 87, 88, and 89).

Numbers of REGs in the other part of two adjacent REG sets in the set1 are consecutive. For example, numbers of REGs in the following two adjacent REG sets in the first subset shown in FIG. 11 are consecutive: the second REG set (the REG set including REGs numbered 12, 13, 14, 15, 16, and 17) and a third REG set (a REG set including REGs numbered 18, 19, 20, 21, 22, and 23), the third REG set (the REG set including REGs numbered 18, 19, 20, 21, 22, and 23) and the fourth REG set (the REG set including REGs numbered 24, 25, 26, 27, 28, and 29), the fifth REG set (the REG set including REGs numbered 36, 37, 38, 39, 40, and 41) and a sixth REG set (a REG set including REGs numbered 42, 43, 44, 45, 46, and 47), the sixth REG set (the REG set including REGs numbered 42, 43, 44, 45, 46, and 47) and the seventh REG set (the REG set including REGs numbered 48, 49, 50, 51, 52, and 53), the eighth REG set (the REG set including REGs numbered 60, 61, 62, 63, 64, and 65) and a ninth REG set (a REG set including REGs numbered 66, 67, 68, 69, 70, and 71), the ninth REG set (the REG set including REGs numbered 66, 67, 68, 69, 70, and 71) and the tenth REG set (the REG set including REGs numbered 72, 73, 74, 75, 76, and 77), and the eleventh REG set (the REG set including REGs numbered 84, 85, 86, 87, 88, and 89) and a twelfth REG set (a REG set including REGs numbered 90, 91, 92, 93, 94, and 95).

For example, any one of the four REG sets included in the second subset includes K=6 REGs with consecutive numbers, and the numbers of the K=6 REGs meet a sequence of time domain first and then frequency domain. The four REG sets included in the second subset may be understood as the foregoing set2, and numbers of REGs in any two REG sets in the set2 are non-consecutive.

In the method 1000, optionally, a quantity of symbols included in one of the P subsets in time domain is one of a quantity of one or more candidate symbols in another control resource set in time domain, or a quantity of symbols included in one of the P subsets in time domain is a maximum value of a quantity of one or more candidate symbols in another control resource set in time domain. In this implementation, when the first control resource set and the another control resource set coexist, dispersedly distributed resource elements can be reduced or eliminated as much as possible, so that resource use efficiency is improved.

In the method 1000 shown in FIG. 10, optionally, the first control resource set includes a plurality of resource element bundles, and any one of the plurality of resource element bundles includes J resource elements with consecutive numbers, where J is a positive integer. For example, J may be equal to 2, 6, or K, or J may be equal to another positive integer greater than 2. This is not limited in this application. A value of J may be predefined, or may be configured by using information and/or signaling (for example, configured by using higher layer signaling and/or downlink control information). In a possible implementation of numbering the resource element bundles, the plurality of resource element bundles have consecutive numbers, and the numbers of the plurality of resource element bundles meet a numbering sequence of time domain first and then frequency domain.

The numbers of the foregoing resource element bundles help implement precoding processing on the control information, so that receiving/sending performance of the control information is further improved. For more specific descriptions of the numbers of the resource element bundles, refer to the descriptions of the numbers of the resource element bundles in the method shown in FIG. 5. Details are not described herein again.

The part 1010 and the part 1020 in FIG. 10 may alternatively be replaced with other implementations.

In another possible implementation of the part 1010 and the part 1020, the part 1010 and the part 1020 may be respectively replaced with the following operation 13 and operation 14.

Operation 13: A terminal determines a first control resource set, where the first control resource set includes P subsets, the first control resource set includes a plurality of resource elements, and P is an integer greater than 1. The plurality of resource elements included in the first control resource set are numbered based on the following step 10-1 to step 10-4.

Operation 14: A network device determines a first control resource set, where the first control resource set includes P subsets, the first control resource set includes a plurality of resource elements, and P is an integer greater than 1. The plurality of resource elements included in the first control resource set are numbered based on the following step 10-1 to step 10-4.

Step 10-1: In a first subset in the P subsets, number, in a sequence of time domain first and then frequency domain, all resource elements that are not numbered. When a quantity of resource elements that are numbered reaches K, and a frequency corresponding to a resource 4?element that is in resource elements participating in numbering in the first subset and that has a largest number is greater than a frequency corresponding to a resource element that is in resource elements participating in numbering in a second subset and that has a largest number, the second subset is processed to number resource elements that are not numbered in the second subset (for example, refer to step 10-2); otherwise, resource elements in the first subset that are not numbered are continued to be numbered in the first subset in the sequence of time domain first and then frequency domain. It may be understood that when none of resource elements included in the second subset participates in numbering, it may be considered that the frequency corresponding to the resource element that is in the resource elements participating in numbering in the first subset and that has the largest number is greater than the frequency corresponding to the resource element that is in the resource elements participating in numbering in the second subset and that has the largest number.

Step 10-2: In a $p^{th}$ subset in the P subsets (p is an integer greater than 1 and less than P), number, in the sequence of time domain first and then frequency domain, all resource elements that are not numbered. When a quantity of resource elements that are numbered reaches K, and a frequency corresponding to a resource element that is in resource elements participating in numbering in the $p^{th}$ subset and that has a largest number is greater than a frequency corresponding to a resource element that is in resource elements participating in numbering in a $(p+1)^{th}$ subset and that has a largest number, the $(p+1)^{th}$ subset is processed to number resource elements that are not numbered in the $(p+1)^{th}$ subset; otherwise, resource elements in the $p^{th}$ subset that are not numbered are continued to be numbered in the $p^{th}$ subset in the sequence of time domain first and then frequency domain. It may be understood that when none of resource elements included in the $(p+1)^{th}$ subset participates in numbering, it may be considered that the frequency corresponding to the resource element that is in the resource elements participating in numbering in the $p^{th}$ subset and that has the largest number is greater than the frequency corresponding to the resource element that is in the resource elements participating in numbering in the $(p+1)^{th}$ subset and that has the largest number.

Step 10-3: In a $P^{th}$ subset in the P subsets, number, in the sequence of time domain first and then frequency domain, all resource elements that are not numbered. When a quantity of resource elements that are numbered reaches K, and a frequency corresponding to a resource element that is in resource elements participating in numbering in the $P^{th}$ subset and that has a largest number is greater than the frequency corresponding to the resource element that is in the resource elements participating in numbering in the first subset and that has the largest number, the first subset is processed to number resource elements in the first subset that are not numbered; otherwise, resource elements in the $P^{th}$ subset that are not numbered are continued to be numbered in the $P^{th}$ subset in the sequence of time domain first and then frequency domain.

Step 10-4: Repeat step 10-1 to step 10-3 until all resource elements included in the first control resource set are numbered.

In another possible implementation of the part 1010 and the part 1020, the part 1010 and the part 1020 may be respectively replaced with the following operation 15 and operation 16.

Operation 15: A terminal determines a first control resource set, where a quantity of symbols included in the first control resource set in time domain is a positive integer less than or equal to M, and M is a positive integer (for example, M is an integer greater than 3, or M is a positive integer less than or equal to 3). The first control resource set includes P subsets, and P is an integer greater than 1. Numbers of a plurality of resource elements included in the first control resource set meet: One subset in the P subsets includes a plurality of resource element sets set1, and one resource element set in the plurality of resource element sets set1 includes K resource elements, where K is a positive integer, the K resource elements have consecutive numbers, the numbers of the K resource elements meet a sequence of time domain first and then frequency domain, numbers of resource elements in a part of two adjacent resource element sets in the plurality of resource element sets set1 are non-consecutive, and numbers of resource elements in the other part of two adjacent resource element sets in the plurality of resource element sets set1 are consecutive. Optionally, another subset in the P subsets includes a plurality of resource element sets set2, and one resource element set in the plurality of resource element sets set2 includes K resource element sets, where K is a positive integer, the K resource elements have consecutive numbers, the numbers of the K resource elements meet the sequence of time domain first and then frequency domain, and numbers of resource elements in any two resource element sets in the plurality of resource element sets set2 are non-consecutive.

Operation 16: A network device determines a first control resource set, where a quantity of symbols included in the first control resource set in time domain is a positive integer less than or equal to M, and M is a positive integer (for example, M is an integer greater than 3, or M is a positive integer less than or equal to 3). The first control resource set includes P subsets, and P is an integer greater than 1. Numbers of a plurality of resource elements included in the first control resource set meet: One subset in the P subsets includes a plurality of resource element sets set1, and one resource element set in the plurality of resource element sets set1 includes K resource elements, where K is a positive integer, the K resource elements have consecutive numbers, the numbers of the K resource elements meet a sequence of time domain first and then frequency domain, numbers of resource elements in a part of two adjacent resource element sets in the plurality of resource element sets set1 are non-consecutive, and numbers of resource elements in the other part of two adjacent resource element sets in the plurality of resource element sets set1 are consecutive. Optionally, another subset in the P subsets includes a plurality of resource element sets set2, and one resource element set in the plurality of resource element sets set2 includes K resource element sets, where K is a positive integer, the K resource elements have consecutive numbers, the numbers of the K resource elements meet the sequence of time domain first and then frequency domain, and numbers of resource elements in any two resource element sets in the plurality of resource element sets set2 are non-consecutive.

The implementation including the foregoing parts 1010, 1020, and 1030 may also be understood as another possible implementation in which the method described in FIG. 10 is combined with the method described in FIG. 3. For other specific content of this implementation, refer to the foregoing descriptions of corresponding content in FIG. 3 and FIG. 10. Details are not described herein again.

In the method 500, the method 800, or the method 1000, optionally, when a first condition is met, the terminal receives the control information on the one or more resource elements in the first control resource set. Further optionally, when the first condition is met, the terminal receives the control information on the one or more resource elements in the first control resource set based on a number described in a corresponding method.

For example, in the part 530, when the first condition is met, the terminal receives the control information on the one or more resource elements in the first control resource set based on the number described in the part 510. For another example, in the part 830, when the first condition is met, the terminal receives the control information on the one or more resource elements in the first control resource set based on the number described in the part 810. For another example, in the part 1030, when the first condition is met, the terminal receives the control information on the one or more resource elements in the first control resource set based on the number described in the part 1010.

The first condition includes one or two of the following two conditions:

A quantity of symbols included in the first control resource set in time domain is an integer greater than 3.
The control information is not detected in a second control resource set.

In the method 500, the method 800, or the method 1000, optionally, when a second condition is met, the network device sends the control information on the one or more resource elements in the first control resource set. Further optionally, when the second condition is met, the network device sends the control information on the one or more resource elements in the first control resource set based on a number described in a corresponding method.

For example, in the part 530, when the second condition is met, the network device sends the control information on the one or more resource elements in the first control resource set based on the number described in the part 520. For another example, in the part 830, when the second condition is met, the network device sends the control information on the one or more resource elements in the first control resource set based on the number described in the part 820. For another example, in the part 1030, when the second condition is met, the network device sends the control information on the one or more resource elements in the first control resource set based on the number described in the part 1020.

The second condition includes one or two of the following two conditions:

A quantity of symbols included in the first control resource set in time domain is an integer greater than 3.
The control information is not sent in a second control resource set.

The second control resource set is included in the first control resource set. A quantity of symbols included in the first control resource set in time domain is a positive integer less than or equal to M, and a quantity of symbols included in the second control resource set in time domain is a positive integer less than or equal to L, where L is a positive integer less than M, and M is a positive integer (for example, M is an integer greater than 3, or M is a positive integer less than or equal to 3). Optionally, a numbering manner for resource elements in the second control resource set is different from a numbering manner for resource elements in the first control resource set. Optionally, a numbering manner for resource elements in the second control resource set is the same as a numbering manner for resource elements in one subset in the first control resource set. The second control resource set may also be understood as a legacy control resource set or a backward compatible control resource set. For example, the legacy control resource set or the backward compatible control resource set may be a control resource set for an NR release 15 or an NR release 16.

In this application, M may also be understood as a maximum value of a quantity of one or more first candidate symbols included in the first control resource set in time domain, and L may also be understood as a maximum value of a quantity of one or more second candidate symbols included in the second control resource set in time domain. The quantity of symbols included in the first control resource set in time domain is one of quantities of one or more first candidate symbols, and the quantity of symbols included in the second control resource set in time domain is one of the quantities of one or more second candidate symbols.

Figure 12:
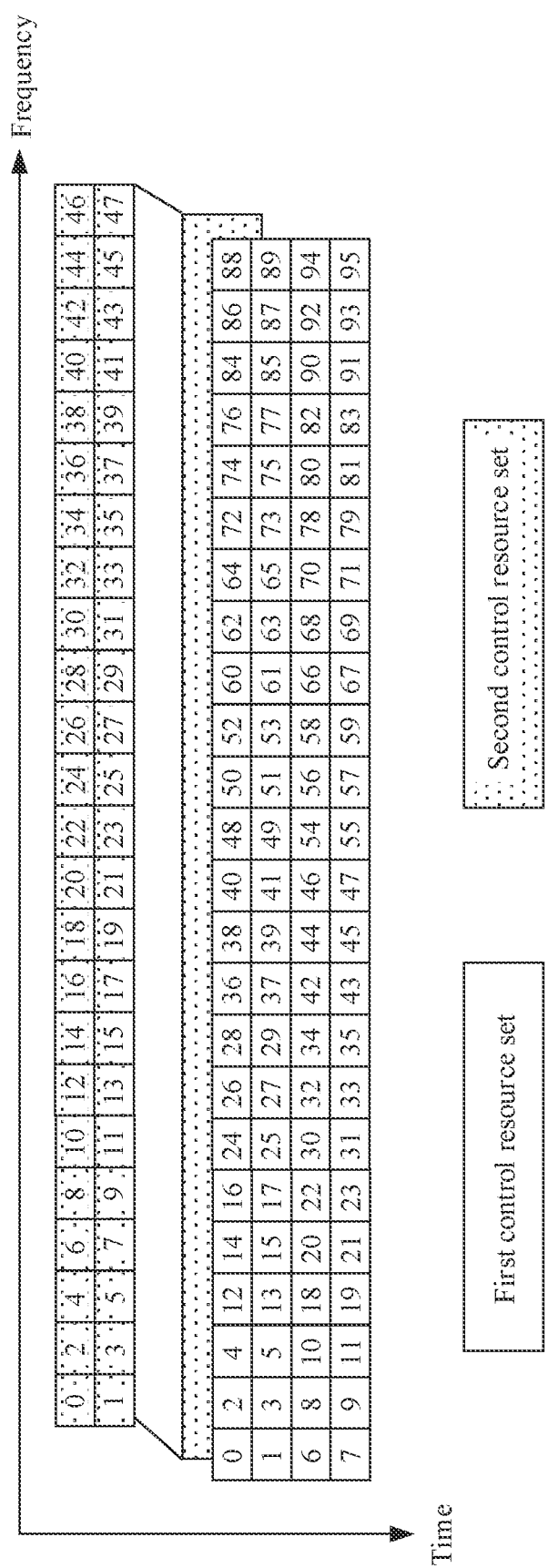
FIG. 12 is a schematic diagram of a possible relationship between a first control resource set and a second control resource set.

FIG. 12 is used as an example to describe a relationship between the first control resource set and the second control resource set. For example, the control resource set is a CORESET and the resource element is a REG. FIG. 12 shows a possible example of a first CORESET and a second CORESET. A quantity of one or more first candidate symbols in the first CORESET in time domain is a positive integer (that is, 1, 2, 3, or 4) less than or equal to M=4, and the first CORESET includes four symbols in time domain and 24 RBs in frequency domain, or it may be understood that the first CORESET includes 4×24=96 REGs. A quantity of one or more second candidate symbols in the second CORESET in time domain is a positive integer (that is, 1, 2, or 3) less than or equal to L=3, the second CORESET includes 24 RBs that are the same as the first CORESET in frequency domain, and includes two symbols in time domain, and the two symbols are the same as a first symbol and a second symbol that are included in the first CORESET. Alternatively, it may be understood that 2.24=48 REGs included in the second CORESET are the same as 48 REGs included in the first CORESET on the first symbol and the second symbol. Numbers of REGs in the first CORESET and the second CORESET are shown in FIG. 12.

As shown in FIG. 12, a numbering manner for REGs in the second CORESET is different from a numbering manner for REGs in the first CORESET. Numbers of all REGs in the second CORESET meet a consecutive sequence of time domain first and then frequency domain, but numbers of REGs in the first CORESET meet the numbers described in the part 510 or the part 520.

A condition for receiving/sending the control information in the first control resource set is limited, so that the control information can be detected in a control resource set that includes a smaller quantity of symbols in time domain, time required for detecting the control information can be reduced, and power consumption of the terminal in detecting the control information can be reduced.

Figure 13:
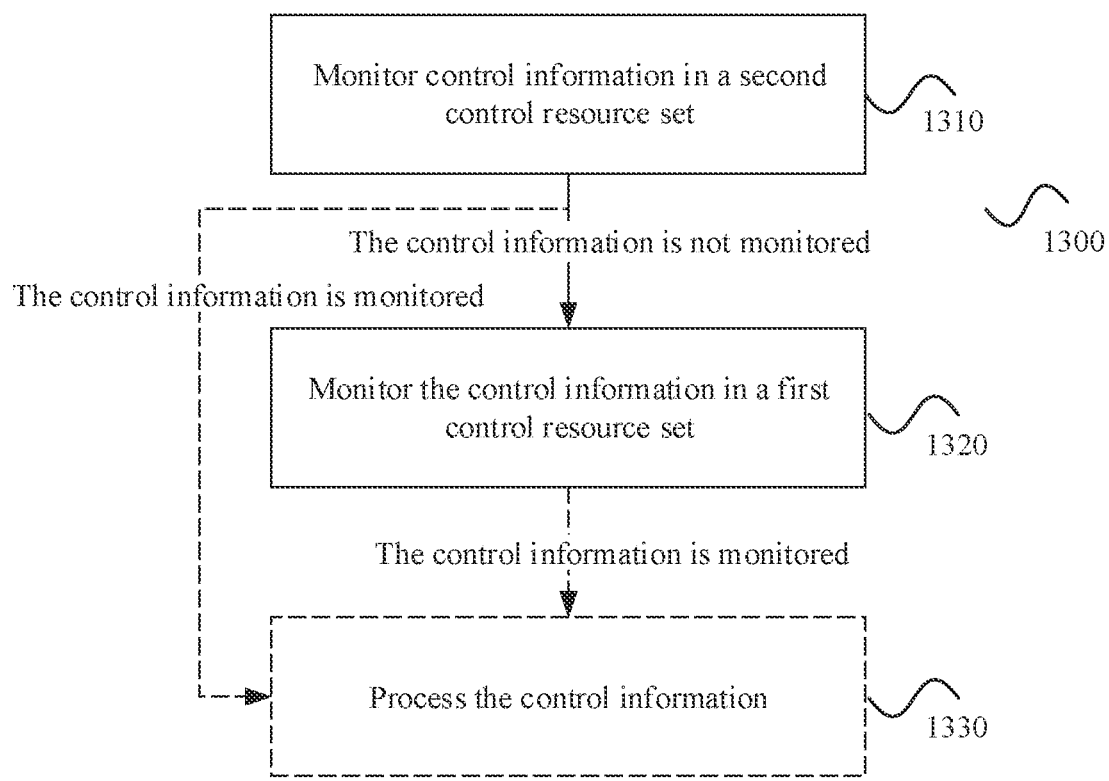
FIG. 13 is a schematic flowchart of another communication method according to an embodiment of this application.

FIG. 13 is a schematic flowchart of another communication method 1300 according to an embodiment of this application. The method 1300 shown in FIG. 13 may be performed by a terminal. However, this application does not limit an entity for performing the method. For example, the method may alternatively be performed by a chip, a chip system, or a processor that supports the terminal in implementing the method. It may be understood that the embodiment described in FIG. 13 may be implemented as a separate implementation, and may alternatively be combined with another embodiment and/or implementation of this application without a conflict, to generate a new embodiment and/or implementation.

As shown in FIG. 13, a method 1300 in this embodiment may include the following parts.

Part 1310: Monitor control information in a second control resource set.

Part 1320: If the control information is not monitored in the second control resource set, monitor the control information in a first control resource set. One or more resource elements included in the second control resource set are included in the first control resource set. A quantity of symbols included in the first control resource set in time domain is a positive integer less than or equal to M, and a quantity of symbols included in the second control resource set in time domain is a positive integer less than or equal to L, where L is a positive integer less than M, and M is a positive integer (for example, M is an integer greater than 3, or M is a positive integer less than or equal to 3). Optionally, a numbering manner for resource elements in the second control resource set is different from a numbering manner for resource elements in the first control resource set. Optionally, a numbering manner for resource elements in the second control resource set is the same as a numbering manner for resource elements in one subset in the first control resource set.

Optionally, the method 1300 may further include a part 1330: If the control information is monitored in the second control resource set, process the control information; or if the control information is monitored in the first control resource set, process the control information. Processing the control information may be understood as performing processing such as demodulation and/or decoding on the control information.

For a relationship between the first control resource set and the second control resource set, refer to FIG. 12 and the foregoing corresponding descriptions. Details are not described herein again.

The control information is preferentially monitored in the second control resource set, so that the control information can be detected in a control resource set that includes a smaller quantity of symbols in time domain, time required for detecting the control information can be reduced, and power consumption of the terminal in detecting the control information can be reduced.

In this application, a numbering manner of time domain first and then frequency domain may also be understood as a numbering manner of time domain first; to be specific, ascending numbering is performed in a time domain first manner. In other words, resource elements in a subset included in the first control resource set are numbered first based on time domain and then frequency domain. Alternatively, it may be understood that resource elements in a subset included in the first control resource set are numbered in ascending order in which time domain precedes frequency domain. In a subset, a number of a resource element that is located on a first symbol in time domain and in a lowest position in frequency domain is the smallest. For example, in a first subset included in the first control resource set, a number of a REG that is located on a first symbol in time domain and on a lowest RB in frequency domain is 0, and if a quantity of time domain symbols corresponding to the first subset is greater than 1, numbers of two adjacent REGs in frequency domain are non-consecutive. In the subset, an increasing direction of numbers of REGs in a symbol is the same as an increasing direction of numbers of RBs in the subset, or increasing directions of numbers of REGs in a symbol in the subset are the same. In addition, such a numbering manner of time domain first for resource elements may also be applied to a case in which a subset occupies one symbol in time domain. For example, when $N_{symb}^{CORESET}$ is equal to 1, REGs in the subset may be numbered in ascending order of RB numbers. It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

Corresponding to the methods provided in the foregoing method embodiments, an embodiment of this application further provides a corresponding apparatus, including a module configured to execute the foregoing embodiments. The module may be software, hardware, or a combination of software and hardware.

Figure 14:
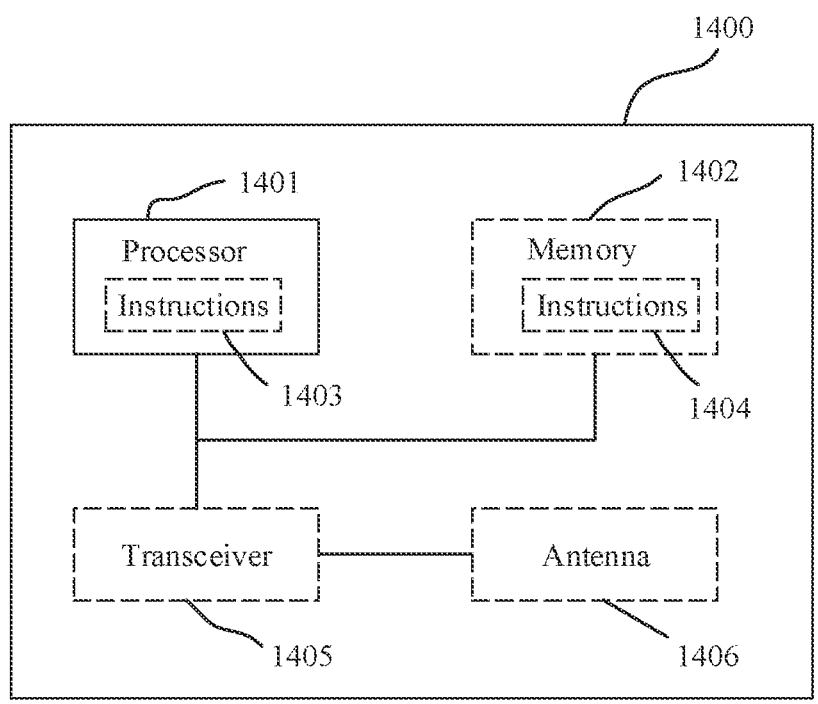
FIG. 14 is a schematic diagram of a structure of a communication apparatus according to an embodiment of this application.

FIG. 14 is a schematic diagram of a structure of an apparatus. The apparatus 1400 may be a network device; or may be a terminal device; or may be a chip, a chip system, a processor, or the like that supports a network device in implementing the foregoing methods; or may be a chip, a chip system, a processor, or the like that supports a terminal device in implementing the foregoing methods. The apparatus may be configured to implement the methods described in the foregoing method embodiments. For details, refer to the descriptions in the foregoing method embodiments.

The apparatus 1400 may include one or more processors 1401. The processor 1401 may also be referred to as a processing unit, and may implement a control function. The processor 1401 may be a general-purpose processor, a dedicated processor, or the like. For example, the processor 1401 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 1401 may also store instructions and/or data 1403, and the instructions and/or the data 1403 may be run by the processor, so that the apparatus 1400 is enabled to perform the method described in the foregoing method embodiment.

In another optional design, the processor 1401 may include a transceiver unit configured to implement a sending function and a receiving function. For example, the transceiver unit may be a transceiver circuit, an interface, or an interface circuit. A transceiver circuit, an interface, or an interface circuit configured to implement the sending function and that configured to implement the receiving function may be separated, or may be integrated. The transceiver circuit, the interface, or the interface circuit may be configured to read and write code/data. Alternatively, the transceiver circuit, the interface, or the interface circuit may be configured to transmit or transfer a signal.

In still another possible design, the apparatus 1400 may include a circuit, and the circuit may implement the sending, receiving, or communication function in the foregoing method embodiments.

Optionally, the apparatus 1400 may include one or more memories 1402 that may store instructions 1404, and the instructions may be run on the processor, so that the apparatus 1400 is enabled to perform the method described in the foregoing method embodiment. Optionally, the memory may further store data. Optionally, the processor may also store instructions and/or data. The processor and the memory may be disposed separately, or may be integrated. For example, the correspondences described in the foregoing method embodiments may be stored in the memory or stored in the processor.

Optionally, the apparatus 1400 may further include a transceiver 1405 and/or an antenna 1406. The processor 1401 may be referred to as a processing unit, and controls the apparatus 1400. The transceiver 1405 may be referred to as a transceiver unit, a transceiver circuit, a transceiver apparatus, or a transceiver module, and is configured to implement a receiving/sending function.

Optionally, the apparatus 1400 in this embodiment of this application may be configured to perform the method described in FIG. 3, FIG. 5, FIG. 8, FIG. 10, or FIG. 13 in the embodiments of this application, or may be configured to perform a method obtained after the methods described in the foregoing two or more figures are combined.

In a possible design, the apparatus 1400 (for example, an integrated circuit, a wireless device, a circuit module, or a terminal) may include a processor 1401 and a transceiver 1405. The processor 1401 is configured to determine a first control resource set, where a quantity of symbols included in the first control resource set in time domain is a positive integer less than or equal to M, and M is an integer greater than 3. The transceiver 1405 is configured to receive control information on one or more resource elements in the first control resource set. Optionally, the first control resource set includes P subsets, and P is an integer greater than 1. Further optionally, all the P subsets include a same quantity of symbols in time domain.

In the foregoing apparatus, a resource that can carry the control information is added, so that a terminal with a low bandwidth capability can support use of a relatively high aggregation level to receive/send the control information. Therefore, control information receiving/sending performance of the terminal with a low bandwidth capability is improved, for example, reliability of receiving/sending the control information can be improved. In addition, the foregoing apparatus helps increase a transmission distance of the control information, so that coverage of the control information is enhanced.

In some possible implementations of the apparatus 1400, numbers of a plurality of resource elements included in the first control resource set meet:
one subset in the P subsets includes a plurality of resource element sets, and one resource element set in the plurality of resource element sets includes K resource elements, where K is a positive integer, the K resource elements have consecutive numbers, and the numbers of the K resource elements meet a sequence of time domain first and then frequency domain; and
numbers of resource elements in any two adjacent resource element sets in the plurality of resource element sets are non-consecutive; numbers of resource elements in at least two adjacent resource element sets in the plurality of resource element sets are non-consecutive; or numbers of resource elements in a part of two adjacent resource element sets in the plurality of resource element sets are non-consecutive, and numbers of resource elements in the other part of two adjacent resource element sets in the plurality of resource element sets are consecutive.

When the number is used, resource elements in the first control resource set can be alternately numbered (which may alternatively be understood as interleaved numbering) among a plurality of subsets or in a plurality of subsets, so that control resource utilization can be improved, and resource waste can be reduced, and therefore receiving/sending performance of the control information can be improved.

In some possible implementations of the apparatus 1400, numbers of a plurality of resource elements included in the first control resource set meet: A plurality of resource elements included in any one of the P subsets have consecutive numbers, and the numbers of the plurality of resource elements meet a sequence of time domain first and then frequency domain.

When the number is used, resource elements in the first control resource set can be numbered in a plurality of subsets in a centralized manner, to reduce dispersed resource elements and ensure effective utilization of the resource element.

In the apparatus 1400, optionally, the transceiver 1405 receives the control information on a plurality of resource elements in the first control resource set based on numbers of a part or all of resource elements included in any one of the foregoing first control resource sets.

In some possible implementations of the apparatus 1400, when a first condition is met, the transceiver 1405 receives the control information on one or more resource elements in the first control resource set, where the first condition includes one or more of the following:
a quantity of symbols included in the first control resource set in time domain is an integer greater than 3; and
the control information is not detected in a second control resource set, where the second control resource set is included in the first control resource set, a quantity of symbols included in the second control resource set in time domain is a positive integer less than or equal to L, and L is a positive integer less than M.

In the foregoing apparatus, a condition for receiving the control information in the first control resource set is limited, so that the control information can be preferentially detected in a control resource set that includes a smaller quantity of symbols in time domain, time required for detecting the control information can be reduced, and power consumption of a terminal in detecting the control information can be reduced.

In some possible implementations of the apparatus 1400, the first control resource set includes a plurality of resource element bundles (bundle), and any one of the plurality of resource element bundles includes J resource elements with consecutive numbers, where J is a positive integer. Optionally, the plurality of resource element bundles have consecutive numbers, and the numbers of the plurality of resource element bundles meet a sequence of time domain first and then frequency domain.

The numbers of the foregoing resource element bundles help implement precoding processing on the control information, so that receiving/sending performance of the control information is further improved.

In another possible design, the apparatus 1400 (for example, an integrated circuit, a wireless device, a circuit module, a network device, or a terminal) may include a processor 1401 and a transceiver 1405. The processor 1401 is configured to determine a first control resource set, where a quantity of symbols included in the first control resource set in time domain is a positive integer less than or equal to M, and M is an integer greater than 3. The transceiver 1405 is configured to send control information on one or more resource elements in the first control resource set. Optionally, the first control resource set includes P subsets, and P is an integer greater than 1. Further optionally, all the P subsets include a same quantity of symbols in time domain.

In the foregoing apparatus, a resource that can carry the control information is added, so that a terminal with a low bandwidth capability can support use of a relatively high aggregation level to receive/send the control information. Therefore, control information receiving/sending performance of the terminal with a low bandwidth capability is improved, for example, reliability of receiving/sending the control information can be improved. In addition, the foregoing apparatus helps increase a transmission distance of the control information, so that coverage of the control information is enhanced.

In some possible implementations of the apparatus 1400, numbers of a plurality of resource elements included in the first control resource set meet:
  one subset in the P subsets includes a plurality of resource element sets, and one resource element set in the plurality of resource element sets includes K resource elements, where K is a positive integer, the K resource elements have consecutive numbers, and the numbers of the K resource elements meet a sequence of time domain first and then frequency domain; and
  numbers of resource elements in any two adjacent resource element sets in the plurality of resource element sets are non-consecutive; numbers of resource elements in at least two adjacent resource element sets in the plurality of resource element sets are non-consecutive; or numbers of resource elements in a part of two adjacent resource element sets in the plurality of resource element sets are non-consecutive, and numbers of resource elements in the other part of two adjacent resource element sets in the plurality of resource element sets are consecutive.

When the number is used, resource elements in the first control resource set can be alternately numbered (which may alternatively be understood as interleaved numbering) among a plurality of subsets or in a plurality of subsets, so that control resource utilization can be improved, and resource waste can be reduced, and therefore receiving/sending performance of the control information can be improved.

In some possible implementations of the apparatus 1400, numbers of a plurality of resource elements included in the first control resource set meet: A plurality of resource elements included in any one of the P subsets have consecutive numbers, and the numbers of the plurality of resource elements meet a sequence of time domain first and then frequency domain.

When the number is used, resource elements in the first control resource set can be numbered in a plurality of subsets in a centralized manner, to reduce dispersed resource elements and ensure effective utilization of the resource element.

In the apparatus 1400, optionally, the processor 1401 maps the control information on a plurality of resource elements in the first control resource set based on numbers of a part or all of resource elements included in any one of the foregoing first control resource sets, and the processor 1405 sends the control information.

In some possible implementations of the apparatus 1400, when a second condition is met, the transceiver 1405 sends the control information on one or more resource elements in the first control resource set, where the second condition includes one or more of the following:
  a quantity of symbols included in the first control resource set in time domain is an integer greater than 3; and
  the control information is not sent in a second control resource set, where the second control resource set is included in the first control resource set, a quantity of symbols included in the second control resource set in time domain is a positive integer less than or equal to L, and L is a positive integer less than M.

In the foregoing apparatus, a condition for sending the control information in the first control resource set is limited, so that the control information can be preferentially sent in a control resource set that includes a smaller quantity of symbols in time domain, and time and power consumption required by the terminal to detect the control information can be reduced.

In some possible implementations of the apparatus 1400, the first control resource set includes a plurality of resource element bundles (bundle), and any one of the plurality of resource element bundles includes J resource elements with consecutive numbers, where J is a positive integer. Optionally, the plurality of resource element bundles have consecutive numbers, and the numbers of the plurality of resource element bundles meet a sequence of time domain first and then frequency domain.

The numbers of the foregoing resource element bundles help implement precoding processing on the control information, so that receiving/sending performance of the control information is further improved.

The processor and the transceiver described in this application may be implemented in an integrated circuit (IC), an analog IC, a radio frequency integrated circuit RFIC, a mixed-signal IC, an application-specific integrated circuit (ASIC), a printed circuit board (PCB), an electronic device, or the like. The processor and the transceiver may also be fabricated by using various IC process technologies, for example, a complementary metal oxide semiconductor (CMOS), an n-type metal oxide semiconductor (NMOS), a positive channel metal oxide semiconductor (pPMOS), a bipolar junction transistor (BJT), a bipolar CMOS (BiCMOS), silicon germanium (SiGe), and gallium arsenide (GaAs).

The apparatus described in the foregoing embodiment may be a network device or a terminal device. However, a range of the apparatus described in this application is not limited thereto, and a structure of the apparatus may not be limited to FIG. 14. The apparatus may be an independent device, or may be a part of a larger device. For example, the apparatus may be as follows:
  (1) an independent integrated circuit IC, a chip, or a chip system or subsystem;

(2) a set of one or more ICs, where optionally, the IC set may also include a storage component configured to store data and/or instructions;
(3) an ASIC, for example, a modem (MSM);
(4) a module that can be embedded in another device;
(5) a receiver, a terminal, a smart terminal, a cellular phone, a wireless device, a handset, a mobile unit, a vehicle-mounted device, a network device, a cloud device, an artificial intelligent device, a machine device, a household device, a medical device, an industrial device, or the like;
(6) others, or the like.

Figure 15:
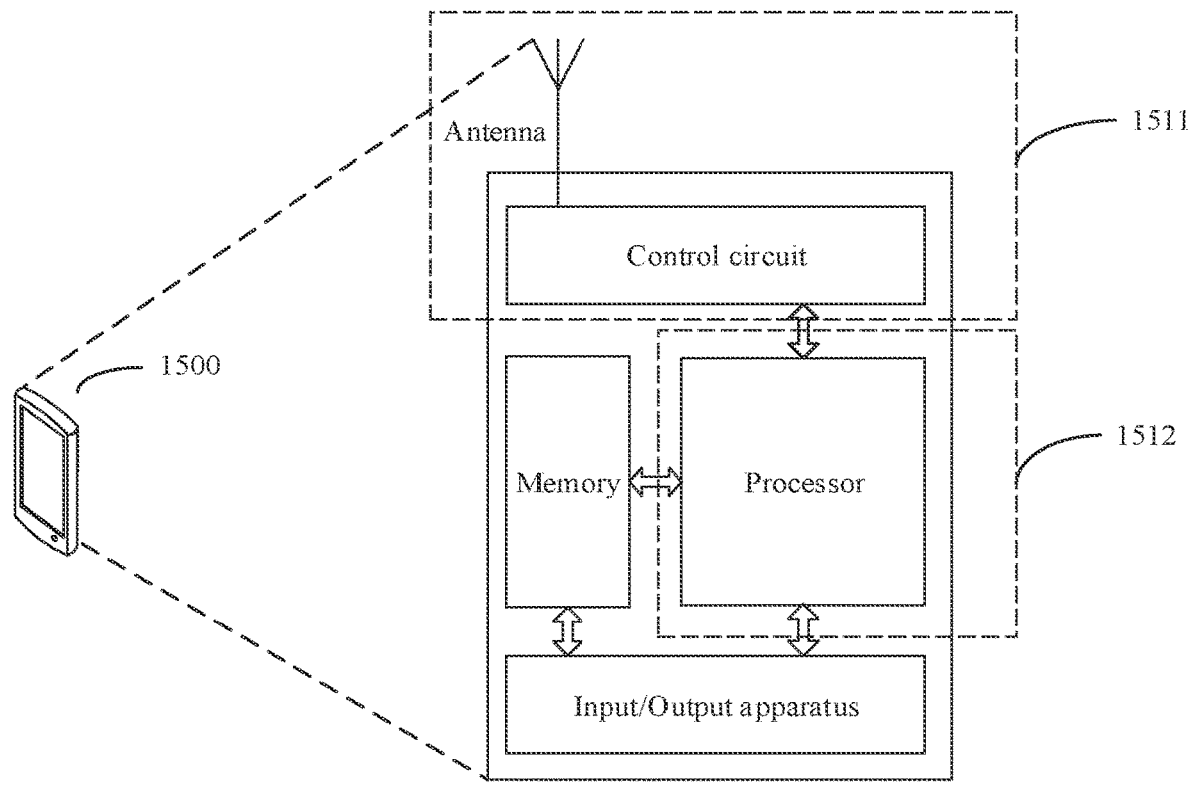
FIG. 15 is a schematic diagram of a structure of a terminal according to an embodiment of this application.

FIG. 15 is a schematic diagram of a structure of a terminal device. The terminal device is applicable to the scenario shown in FIG. 1. For ease of description, FIG. 15 shows only main components of the terminal device. As shown in FIG. 15, the terminal device 1500 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, such as a touchscreen, a display screen, and a keyboard, is mainly configured to receive data input by a user and output data to the user.

After the terminal device is powered on, the processor may read the software program in a storage unit, parse and execute instructions of the software program, and process the data of the software program. When data needs to be sent wirelessly, the processor performs baseband processing on the to-be-sent data, and outputs a baseband signal to the radio frequency circuit. The radio frequency circuit processes the baseband signal to obtain a radio frequency signal, and sends the radio frequency signal in an electromagnetic wave form by using the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description, FIG. 15 shows only one memory and one processor. In an actual terminal device, there may be a plurality of processors and a plurality of memories. The memory may also be referred to as a storage medium, a storage device, or the like. This is not limited in this embodiment of the present application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 15. A person skilled in the art may understand that the baseband processor and the central processing unit each may be an independent processor, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of software program. The processor executes the software program to implement a baseband processing function.

In an example, the antenna and the control circuit that have transceiver functions may be considered as a transceiver unit 1511 of the terminal 1500, and the processor having a processing function may be considered as a processing unit 1512 of the terminal 1500. As shown in FIG. 15, the terminal device 1500 includes the transceiver unit 1511 and the processing unit 1512. The transceiver unit may also be referred to as a transceiver, a transceiver machine, a transceiver apparatus, or the like. Optionally, a component that is in the transceiver unit 1511 and that is configured to implement a receiving function may be considered as a receiving unit, and a component that is in the transceiver unit 1511 and that is configured to implement a sending function may be considered as a sending unit. That is, the transceiver unit 1511 includes the receiving unit and the sending unit. For example, the receiving unit may also be referred to as a receiver machine, a receiver, a receiving circuit, or the like; and the sending unit may be referred to as a transmitter machine, a transmitter, a transmitting circuit, or the like. Optionally, the receiving unit and the sending unit may be one integrated unit, or may be a plurality of independent units. The receiving unit and the sending unit may be in one geographical location, or may be distributed in a plurality of geographical locations.

Figure 16:
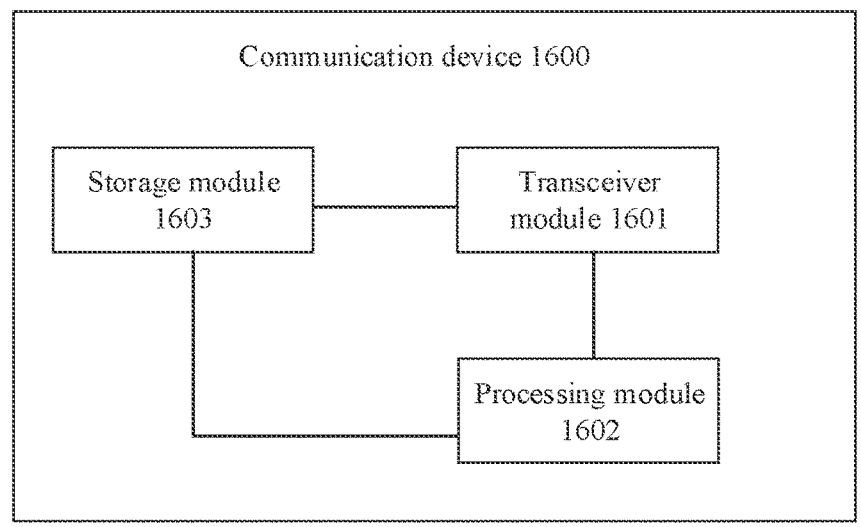
FIG. 16 is a schematic diagram of another communication apparatus according to an embodiment of this application.

As shown in FIG. 16, still another embodiment of this application provides an apparatus 1600. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the methods in the method embodiments of this application. The apparatus 1600 may include a processing module 1602 (a processing unit). Optionally, the apparatus may further include a transceiver module 1601 (a transceiver unit) and a storage module 1603 (a storage unit).

In a possible design, one or more modules in FIG. 16 may be implemented by one or more processors, or may be implemented by one or more processors and one or more memories, or may be implemented by one or more processors and one or more transceivers, or may be implemented by one or more processors, one or more memories, and one or more transceivers. This is not limited in this embodiment of this application. The processor, the memory, and the transceiver may be disposed separately, or may be integrated.

The apparatus has a function of implementing the terminal described in the embodiments of this application. For example, the apparatus includes a corresponding module, unit, or means used for the terminal to perform the steps related to the terminal that are described in the embodiments of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments. Alternatively, the apparatus has a function of implementing the network device described in the embodiments of this application. For example, the apparatus includes a corresponding module, unit, or means used for the network device to perform the steps related to the network device that are described in the embodiments of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments.

Optionally, the modules in the apparatus 1600 in this embodiment of this application may be configured to perform the method described in FIG. 3, FIG. 5, FIG. 8, FIG. 10, or FIG. 13 in the embodiments of this application, or may be configured to perform a method obtained after the methods described in the foregoing two or more figures are combined.

In a possible design, the apparatus 1600 may include a processing module 1602 and a transceiver module 1601. The processing module 1602 is configured to determine a first control resource set, where a quantity of symbols included in the first control resource set in time domain is a positive integer less than or equal to M, and M is an integer greater than 3. The transceiver module 1601 is configured to receive control information on one or more resource elements in the first control resource set. Optionally, the first control resource set includes P subsets, and P is an integer greater than 1. Further optionally, all the P subsets include a same quantity of symbols in time domain.

In the foregoing apparatus, a resource that can carry the control information is added, so that a terminal with a low bandwidth capability can support use of a relatively high aggregation level to receive/send the control information. Therefore, control information receiving/sending performance of the terminal with a low bandwidth capability is improved, for example, reliability of receiving/sending the control information can be improved. In addition, the foregoing apparatus helps increase a transmission distance of the control information, so that coverage of the control information is enhanced.

In some possible implementations of the apparatus 1600, numbers of a plurality of resource elements included in the first control resource set meet:

one subset in the P subsets includes a plurality of resource element sets, and one resource element set in the plurality of resource element sets includes K resource elements, where K is a positive integer, the K resource elements have consecutive numbers, and the numbers of the K resource elements meet a sequence of time domain first and then frequency domain; and numbers of resource elements in any two adjacent resource element sets in the plurality of resource element sets are non-consecutive; numbers of resource elements in at least two adjacent resource element sets in the plurality of resource element sets are non-consecutive; or numbers of resource elements in a part of two adjacent resource element sets in the plurality of resource element sets are non-consecutive, and numbers of resource elements in the other part of two adjacent resource element sets in the plurality of resource element sets are consecutive.

When the number is used, resource elements in the first control resource set can be alternately numbered (which may alternatively be understood as interleaved numbering) among a plurality of subsets or in a plurality of subsets, so that control resource utilization can be improved, and resource waste can be reduced, and therefore receiving/sending performance of the control information can be improved.

In some possible implementations of the apparatus 1600, numbers of a plurality of resource elements included in the first control resource set meet: A plurality of resource elements included in any one of the P subsets have consecutive numbers, and the numbers of the plurality of resource elements meet a sequence of time domain first and then frequency domain.

When the number is used, resource elements in the first control resource set can be numbered in a plurality of subsets in a centralized manner, to reduce dispersed resource elements and ensure effective utilization of the resource element.

In the apparatus 1600, optionally, the transceiver module 1601 receives the control information on one or more resource elements in the first control resource set based on numbers of a part or all of resource elements included in any one of the foregoing first control resource sets.

In some possible implementations of the apparatus 1600, when a first condition is met, the transceiver module 1601 receives the control information on one or more resource elements in the first control resource set, where the first condition includes one or more of the following:

a quantity of symbols included in the first control resource set in time domain is an integer greater than 3; and the control information is not detected in a second control resource set, where the second control resource set is included in the first control resource set, a quantity of symbols included in the second control resource set in time domain is a positive integer less than or equal to L, and L is a positive integer less than M.

In the foregoing apparatus, a condition for receiving the control information in the first control resource set is limited, so that the control information can be preferentially detected in a control resource set that includes a smaller quantity of symbols in time domain, time required for detecting the control information can be reduced, and power consumption of a terminal in detecting the control information can be reduced.

In some possible implementations of the apparatus 1600, the first control resource set includes a plurality of resource element bundles (bundle), and any one of the plurality of resource element bundles includes J resource elements with consecutive numbers, where J is a positive integer. Optionally, the plurality of resource element bundles have consecutive numbers, and the numbers of the plurality of resource element bundles meet a sequence of time domain first and then frequency domain.

The numbers of the foregoing resource element bundles help implement precoding processing on the control information, so that receiving/sending performance of the control information is further improved.

In another possible design, the apparatus 1600 may include a processing module 1602 and a transceiver module 1601. The processing module 1602 is configured to determine a first control resource set, where a quantity of symbols included in the first control resource set in time domain is a positive integer less than or equal to M, and M is an integer greater than 3. The transceiver module 1601 is configured to send control information on one or more resource elements in the first control resource set. Optionally, the first control resource set includes P subsets, and P is an integer greater than 1. Further optionally, all the P subsets include a same quantity of symbols in time domain.

In the foregoing apparatus, a resource that can carry the control information is added, so that a terminal with a low bandwidth capability can support use of a relatively high aggregation level to receive/send the control information. Therefore, control information receiving/sending performance of the terminal with a low bandwidth capability is improved, for example, reliability of receiving/sending the control information can be improved. In addition, the foregoing apparatus helps increase a transmission distance of the control information, so that coverage of the control information is enhanced.

In some possible implementations of the apparatus 1600, numbers of a plurality of resource elements included in the first control resource set meet:

one subset in the P subsets includes a plurality of resource element sets, and one resource element set in the plurality of resource element sets includes K resource elements, where K is a positive integer, the K resource elements have consecutive numbers, and the numbers of the K resource elements meet a sequence of time domain first and then frequency domain; and numbers of resource elements in any two adjacent resource element sets in the plurality of resource element sets are non-consecutive; numbers of resource elements in at least two adjacent resource element sets in the plurality of resource element sets are non-consecutive; or numbers of resource elements in a part of two adjacent resource element sets in the plurality of resource element sets are non-consecutive, and numbers of resource elements in the other part of two adjacent resource element sets in the plurality of resource element sets are consecutive.

When the number is used, resource elements in the first control resource set can be alternately numbered (which may alternatively be understood as interleaved numbering) among a plurality of subsets or in a plurality of subsets, so that control resource utilization can be improved, and resource waste can be reduced, and therefore receiving/sending performance of the control information can be improved.

In some possible implementations of the apparatus 1600, numbers of a plurality of resource elements included in the first control resource set meet: A plurality of resource elements included in any one of the P subsets have consecutive numbers, and the numbers of the plurality of resource elements meet a sequence of time domain first and then frequency domain.

When the number is used, resource elements in the first control resource set can be numbered in a plurality of subsets in a centralized manner, to reduce dispersed resource elements and ensure effective utilization of the resource element.

In the apparatus 1600, optionally, the processing module 1602 maps the control information on a plurality of resource elements in the first control resource set based on numbers of a part or all of resource elements included in any one of the foregoing first control resource sets, and the transceiver module 1601 sends the control information.

In some possible implementations of the apparatus 1600, when a second condition is met, the transceiver module 1601 sends the control information on one or more resource elements in the first control resource set, where the second condition includes one or more of the following:

a quantity of symbols included in the first control resource set in time domain is an integer greater than 3; and the control information is not sent in a second control resource set, where the second control resource set is included in the first control resource set, a quantity of symbols included in the second control resource set in time domain is a positive integer less than or equal to L, and L is a positive integer less than M.

In the foregoing apparatus, a condition for sending the control information in the first control resource set is limited, so that the control information can be preferentially sent in a control resource set that includes a smaller quantity of symbols in time domain, and time and power consumption required by the terminal to detect the control information can be reduced.

In some possible implementations of the apparatus 1600, the first control resource set includes a plurality of resource element bundles (bundle), and any one of the plurality of resource element bundles includes J resource elements with consecutive numbers, where J is a positive integer. Optionally, the plurality of resource element bundles have consecutive numbers, and the numbers of the plurality of resource element bundles meet a sequence of time domain first and then frequency domain.

The numbers of the foregoing resource element bundles help implement precoding processing on the control information, so that receiving/sending performance of the control information is further improved.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person skilled in the art may implement the described functions by using various methods for a corresponding application, but this implementation should not be understood as being beyond the protection scope of the embodiments of this application.

It may be understood that the processor in the embodiments of this application may be an integrated circuit chip, and has a signal processing capability. In an implementation process, the steps in the foregoing method embodiments may be completed by using a hardware integrated logic circuit in a processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, these technologies may be implemented by using hardware, software, or a combination of hardware and software. For hardware implementation, a processing unit configured to execute these technologies on a communication apparatus (for example, a base station, a terminal, a network entity, or a chip) may be implemented in one or more general purpose processors, DSPs, digital signal processing devices, ASICs, programmable logic devices, FPGAs, or other programmable logic devices, discrete gates or transistor logic, discrete hardware components, or any combination of the foregoing devices. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that the memory in the embodiments of this application may be a transitory memory or a non-transitory memory, or may include both a transitory memory and a non-transitory memory. The non-transitory memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The transitory memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct Rambus RAM, DR RAM). It should be noted that, the memory in the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-dense digital video disc (DVD)), a semiconductor medium (for example, a solid-state drive (SSD)), or the like.

It may be understood that "an embodiment" mentioned in the entire specification particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

It may be understood that, in this application, both "when . . . " and "if" mean that the apparatus performs corresponding processing in a specific objective situation, and is not intended to limit time, and does not require an action of determining during implementation of the apparatus, and does not mean that another limitation exists.

"Simultaneously" in this application may be understood as being at a same time point, or may be understood as being within a period of time, or may be understood as being within a same period.

A person skilled in the art may understand that "first", "second", and various numbers in this application are merely differentiated for ease of description, and are not used to limit the scope of the embodiments of this application. A specific value of a number (which may also be referred to as an index), a specific value of a quantity, and a location in this application are merely used as examples, and are not a unique representation form, and are not used to limit the scope of the embodiments of this application. "First", "second", and various numbers in this application are merely differentiated for ease of description, and are not used to limit the scope of the embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural. The character "/" usually represents an "or" relationship between the associated objects.

The term "at least one of . . . " in this specification indicates all or any combination of listed items. For example, "at least one of A, B, and C" may indicate the following six cases: A exists alone, B exists alone, C exists alone, A and B coexist, B and C coexist, and A, B, and C coexist. A may be singular or plural, B may be singular or plural, and C may be singular or plural.

It may be understood that in the embodiments of this application, "B corresponding to A" indicates that B is associated with A, and B may be determined based on A. However, it should further be understood that determining A based on B does not mean that B is determined based on A only; that is, B may also be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may also be other names that can be understood by a communication apparatus, and values or representation manners of the parameters may also be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may be used.

"Predefine" mentioned this application may be understood as "define", "predefine", "store", "pre-store", "pre-negotiate", "pre-configure", "solidify", or "pre-burn".

A person of ordinary skill in the art may be aware that, in combination with the examples described in the embodiments disclosed in this specification, units and algorithm steps can be implemented by electronic hardware or a combination of computer software and electronic hardware. Whether the functions are performed by using hardware or software depends on a particular application and a design constraint condition of the technical solutions. A person skilled in the art may use different methods to implement the described functions for each particular application, but it should not be considered that the implementation goes beyond the scope of this application.

A person of ordinary skill in the art may understand that, for convenience and brevity of description, for a specific working process of the foregoing system, apparatus, and unit, refer to a corresponding process in the foregoing method embodiments, and details are not described herein again.

It may be understood that the system, apparatus, and method described in this application may alternatively be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium, for example, a USB flash drive, a removable hard disk, a read-only memory (ROM), a random access memory (RAM), a magnetic disk, or an optical disc, that can store program code.

For same or similar parts in the embodiments of this application, refer to each other. In the embodiments of this application and the implementations/implementation methods/implementation methods in the embodiments, unless otherwise specified or a logical conflict occurs, terms and/or descriptions are consistent and may be mutually referenced between different embodiments and between the implementations/implementation methods/implementation methods in the embodiments. Technical features in the different embodiments and the implementations/implementation methods/implementation methods in the embodiments may be combined to form a new embodiment, implementation, implementation method, or implementation method according to an internal logical relationship thereof. The foregoing implementations of this application are not intended to limit the protection scope of this application.

The foregoing description is merely a specific implementation of this application, but is not intended to limit the protection scope of this application. Any variation or replacement readily figured out by a person skilled in the art within the technical scope disclosed in this application shall fall within the protection scope of this application.

What is claimed is:

1. An apparatus, comprising:
one or more processors; and
a memory coupled to the one or more processors and storing programming instructions for execution by the one or more processors to cause the apparatus to:
determine a first control resource set, wherein a quantity of symbols comprised in the first control resource set in time domain is a positive integer less than or equal to M, and M is an integer greater than 3; and
receive control information on one or more resource elements in the first control resource set.

2. The apparatus according to claim 1, wherein the first control resource set comprises P subsets, and P is an integer greater than 1.

3. The apparatus according to claim 2, wherein one subset in the P subsets comprises a plurality of resource element sets, and one resource element set in the plurality of resource element sets comprises K resource elements, wherein K is a positive integer, the K resource elements have consecutive numbers, and the numbers of the K resource elements have a sequence of time domain first and then frequency domain, and wherein:
  numbers of resource elements in any two adjacent resource element sets in the plurality of resource element sets are non-consecutive;
  numbers of resource elements in at least two adjacent resource element sets in the plurality of resource element sets are non-consecutive; or
  numbers of resource elements in a part of two adjacent resource element sets in the plurality of resource element sets are non-consecutive, and numbers of resource elements in the other part of two adjacent resource element sets in the plurality of resource element sets are consecutive.

4. The apparatus according to claim 3, wherein receiving the control information on the one or more resource elements in the first control resource set comprises:
  receiving the control information on a plurality of resource elements in the first control resource set based on numbers of a part or all of resource elements comprised in the first control resource set.

5. The apparatus according to claim 2, wherein a plurality of resource elements comprised in any one of the P subsets have consecutive numbers, and the numbers of the plurality of resource elements have a sequence of time domain first and then frequency domain.

6. The apparatus according to claim 2, wherein all the P subsets comprise a same quantity of symbols in time domain.

7. A communication method, comprising:
  determining a first control resource set, wherein a quantity of symbols comprised in the first control resource set in time domain is a positive integer less than or equal to M, and M is an integer greater than 3; and
  receiving control information on one or more resource elements in the first control resource set.

8. The method according to claim 7, wherein the first control resource set comprises P subsets, and P is an integer greater than 1.

9. The method according to claim 8, wherein one subset in the P subsets comprises a plurality of resource element sets, and one resource element set in the plurality of resource element sets comprises K resource elements, wherein K is a positive integer, the K resource elements have consecutive numbers, and the numbers of the K resource elements have a sequence of time domain first and then frequency domain, and wherein:
  numbers of resource elements in any two adjacent resource element sets in the plurality of resource element sets are non-consecutive;
  numbers of resource elements in at least two adjacent resource element sets in the plurality of resource element sets are non-consecutive; or
  numbers of resource elements in a part of two adjacent resource element sets in the plurality of resource element sets are non-consecutive, and numbers of resource elements in the other part of two adjacent resource element sets in the plurality of resource element sets are consecutive.

10. The method according to claim 8, wherein a plurality of resource elements comprised in any one of the P subsets have consecutive numbers, and the numbers of the plurality of resource elements have a sequence of time domain first and then frequency domain.

11. The method according to claim 8, wherein all the P subsets comprise a same quantity of symbols in time domain.

12. A non-transitory computer readable medium storing instructions that, when executed by one or more processors of a first node, cause the first node to:
  determine a first control resource set, wherein a quantity of symbols comprised in the first control resource set in time domain is a positive integer less than or equal to M, and M is an integer greater than 3; and
  receive control information on one or more resource elements in the first control resource set.

13. The non-transitory computer readable medium according to claim 12, wherein the first control resource set comprises P subsets, and P is an integer greater than 1.

14. The non-transitory computer readable medium according to claim 13, wherein one subset in the P subsets comprises a plurality of resource element sets, and one resource element set in the plurality of resource element sets comprises K resource elements, wherein K is a positive integer, the K resource elements have consecutive numbers, and the numbers of the K resource elements have a sequence of time domain first and then frequency domain, and wherein:
  numbers of resource elements in any two adjacent resource element sets in the plurality of resource element sets are non-consecutive;
  numbers of resource elements in at least two adjacent resource element sets in the plurality of resource element sets are non-consecutive; or
  numbers of resource elements in a part of two adjacent resource element sets in the plurality of resource element sets are non-consecutive, and numbers of resource elements in the other part of two adjacent resource element sets in the plurality of resource element sets are consecutive.

15. The non-transitory computer readable medium according to claim 13, wherein a plurality of resource elements comprised in any one of the P subsets have consecutive numbers, and the numbers of the plurality of resource elements have a sequence of time domain first and then frequency domain.

* * * * *